US012620596B2

(12) United States Patent
Lee et al.

(10) Patent No.: US 12,620,596 B2
(45) Date of Patent: May 5, 2026

(54) GRAPHENE-DOPED LITHIUM IRON PHOSPHATE ACTIVE MATERIAL AND METHOD FOR PREPARING THE SAME

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 789 days.

(21) Appl. No.: 17/659,374

(22) Filed: Apr. 15, 2022

(65) Prior Publication Data

US 2022/0289571 A1 Sep. 15, 2022

Related U.S. Application Data

(63) Continuation of application No. PCT/KR2020/014081, filed on Oct. 15, 2020.

(30) Foreign Application Priority Data

Oct. 15, 2019 (KR) ........................ 10-2019-0127836

(51) Int. Cl.
*H01M 4/66* (2006.01)
*C01B 25/37* (2006.01)
(Continued)

(52) U.S. Cl.
CPC ............ *H01M 4/66* (2013.01); *C01B 25/375* (2013.01); *H01M 4/0407* (2013.01);
(Continued)

(58) Field of Classification Search
CPC ...... H01M 4/66; H01M 4/0407; H01M 4/134; H01M 4/1395; H01M 4/366; H01M 10/0525; H01M 10/0562; C01B 25/375
(Continued)

(56) References Cited

U.S. PATENT DOCUMENTS 6,558,848 B1 5/2003 Kobayashi et al.
6,794,087 B2 9/2004 Choi
(Continued)

FOREIGN PATENT DOCUMENTS

CN 1143839 A 2/1997
CN 1329373 A 1/2002
(Continued)

OTHER PUBLICATIONS

Zhou et al., Graphene modified $LiFePO_4$ cathode materials for high power lithium ion batteries, Jan. 2011, Journal of Materials Chemistry, 21, 3353-3358 (Year: 2011).*
(Continued)

*Primary Examiner* — Sean P Cullen
(74) *Attorney, Agent, or Firm* — Secant IP, PLLC

(57) ABSTRACT

A method for preparing a positive electrode active material is provided. The method for preparing a positive electrode active material may comprise the steps of: preparing a lithium precursor, an iron precursor, a phosphorus precursor, and abase solvent; mixing the base solvent and the lithium precursor to prepare a first source, mixing the base solvent and the iron precursor to prepare a second source, and mixing the base solvent and the phosphorus precursor to prepare a third source; and mixing the first source, the
(Continued)

second source, the third source, and a chelating agent and allowing a reaction to occur in the mixture by a heat treatment method to prepare a positive electrode active material comprising a compound of lithium, iron, phosphorus, and oxygen.

5 Claims, 31 Drawing Sheets

(51) Int. Cl.

| | |
|---|---|
| ***H01M 4/02*** | (2006.01) |
| ***H01M 4/04*** | (2006.01) |
| ***H01M 4/134*** | (2010.01) |
| ***H01M 4/1395*** | (2010.01) |
| ***H01M 4/36*** | (2006.01) |
| ***H01M 10/0525*** | (2010.01) |
| ***H01M 10/0562*** | (2010.01) |

(52) U.S. Cl.

CPC ......... *H01M 4/134* (2013.01); *H01M 4/1395* (2013.01); *H01M 4/366* (2013.01); *H01M 10/0525* (2013.01); *H01M 10/0562* (2013.01); *C01P 2002/54* (2013.01); *C01P 2002/74* (2013.01); *H01M 2004/027* (2013.01)

(58) Field of Classification Search

USPC ................................ 429/221, 231.8, 231.95

See application file for complete search history.

(56) References Cited

U.S. PATENT DOCUMENTS

| | | | |
|---|---|---|---|
| 9,735,418 | B2 | 8/2017 | Woo et al. |
| 10,283,762 | B2 | 5/2019 | Hong et al. |
| 10,333,135 | B2 | 6/2019 | Paulsen et al. |
| 10,707,481 | B2 | 7/2020 | Lee et al. |
| 10,734,642 | B2 | 8/2020 | Zhamu et al. |
| 10,858,749 | B2 | 12/2020 | Park et al. |
| 11,021,367 | B2 | 6/2021 | Kang et al. |
| 11,316,145 | B2 | 4/2022 | Woo et al. |
| 12,107,216 | B2 | 10/2024 | Lee et al. |
| 2004/0042954 | A1 | 3/2004 | Park et al. |
| 2009/0269677 | A1 | 10/2009 | Hirose et al. |
| 2010/0323247 | A1 | 12/2010 | Takeshi et al. |
| 2011/0070500 | A1 | 3/2011 | Chen et al. |
| 2012/0043530 | A1 | 2/2012 | Badre et al. |
| 2012/0315550 | A1 | 12/2012 | Liu et al. |
| 2013/0149227 | A1 | 6/2013 | Chon et al. |
| 2013/0164611 | A1 | 6/2013 | Nanba et al. |
| 2014/0170303 | A1 | 6/2014 | Rayner et al. |
| 2014/0349187 | A1 | 11/2014 | Hirose et al. |
| 2014/0377653 | A1 | 12/2014 | Park et al. |
| 2015/0037689 | A1 | 2/2015 | Nishimura et al. |
| 2016/0301008 | A1 | 10/2016 | Mitchell et al. |
| 2017/0117538 | A1 | 4/2017 | Bendimerad et al. |
| 2017/0187066 | A1 | 6/2017 | Tsujimura et al. |
| 2017/0204241 | A1 | 7/2017 | Nicolay et al. |
| 2017/0244098 | A1 | 8/2017 | Duong et al. |
| 2018/0034038 | A1 | 2/2018 | Rogren |
| 2018/0190977 | A1 | 7/2018 | Park et al. |
| 2018/0241032 | A1 | 8/2018 | Pan et al. |
| 2018/0358654 | A1 | 12/2018 | Forsyth et al. |
| 2019/0027781 | A1 | 1/2019 | Lee et al. |
| 2019/0088986 | A1 | 3/2019 | Hu et al. |
| 2019/0379088 | A1 | 12/2019 | Schmidt et al. |
| 2020/0235427 | A1 | 7/2020 | Kim et al. |
| 2022/0158171 | A1 | 5/2022 | Ryu et al. |

FOREIGN PATENT DOCUMENTS

| | | | | | |
|---|---|---|---|---|---|
| CN | 101567462 | A | | 10/2009 | |
| CN | 103887477 | A | * | 6/2014 | ............ H01M 4/625 |
| CN | 105762342 | A | * | 7/2016 | ........ H01M 10/0525 |
| CN | 107180967 | A | * | 9/2017 | ............. B82Y 30/00 |
| CN | 107834044 | A | * | 3/2018 | ........ H01M 10/0525 |
| CN | 109192965 | A | * | 1/2019 | ........ H01M 10/0525 |
| CN | 108028371 | A | | 8/2020 | |
| EP | 3783679 | A1 | | 2/2021 | |
| JP | 08-021388 | B | | 3/1996 | |
| JP | 09-265976 | A | | 10/1997 | |
| JP | 2005-251466 | A2 | | 9/2005 | |
| JP | 2010-111597 | A2 | | 5/2010 | |
| JP | 2016-189321 | A | | 11/2016 | |
| JP | 2018-516435 | A | | 6/2018 | |
| KR | 10-2003-0030818 | A | | 4/2003 | |
| KR | 10-2006-0025515 | A | | 3/2006 | |
| KR | 10-2012-0022629 | A | | 3/2012 | |
| KR | 10-2012-0113685 | A | | 10/2012 | |
| KR | 10-2013-0114097 | A | | 10/2013 | |
| KR | 10-2014-0031953 | A | | 3/2014 | |
| KR | 10-2014-0046611 | A | | 4/2014 | |
| KR | 10-2014-0144590 | A | | 12/2014 | |
| KR | 10-2014-0148384 | A | | 12/2014 | |
| KR | 10-1573423 | B1 | | 12/2015 | |
| KR | 10-2016-0062617 | A | | 6/2016 | |
| KR | 10-2016-0091981 | A | | 8/2016 | |
| KR | 10-1681739 | B1 | | 12/2016 | |
| KR | 10-2017-0077014 | A | | 7/2017 | |
| KR | 10-2017-0081196 | A | | 7/2017 | |
| KR | 10-1788232 | B1 | | 10/2017 | |
| KR | 10-1808373 | B1 | | 12/2017 | |
| KR | 10-2018-0015841 | A | | 2/2018 | |
| KR | 10-2018-0102554 | A | | 9/2018 | |
| KR | 10-2018-0116137 | A | | 10/2018 | |
| KR | 10-2019-0003940 | A | | 1/2019 | |
| KR | 10-2019-0010250 | A | | 1/2019 | |
| KR | 10-2019-0042089 | A | | 4/2019 | |
| KR | 10-2019-0120725 | A | | 10/2019 | |
| WO | 2001/029912 | A1 | | 4/2001 | |
| WO | WO2015080302 | A1 | | 6/2015 | |
| WO | 2018025036 | A1 | | 2/2018 | |
| WO | WO2019031766 | A2 | | 2/2019 | |
| WO | WO2019188358 | A1 | | 10/2019 | |

OTHER PUBLICATIONS

International Search Report for International Application No. PCT/KR2020/014081 mailed Mar. 5, 2021, 4 pages.

Orita et al., "Application of sulfonium-, thiophenium-, and thioxonium-based salts as electric double-layer capacitor electrolytes", Journal of Power Sources, vol. 195, No. 19, pp. 6970-6976 (2010).

Taniki et al., "Effects of HF content in the (FH)n F- anion on the formation of ionic plastic crystal phases of N-ethyl-N-methylpyrrolidinium and N, N-dimethylpyrrolidinium fluorohydrogenate salts", Physical Chemistry Chemical Physics, vol. 16, No. 4, pp. 1522-1528 (2014).

U.S. Appl. No. 17/659,369 (English translation of originally-filed application papers), application filing date Apr. 15, 2022 (78 pages).

U.S. Appl. No. 17/659,370 (English translation of originally-filed application papers), application filing date Apr. 15, 2022 (99 pages).

U.S. Appl. No. 17/659,371 (English translation of originally-filed application papers), application filing date Apr. 15, 2022 (101 pages).

Written Opinion of the International Searching Authority for International Application No. PCT/KR2020/014081 mailed Mar. 5, 2021, 5 pages.

Liu et al., "Unique 3D nanoporous/macroporous structure Cu current collector for dendrite-free lithium deposition", Energy Storage Materials, vol. 17, pp. 253-259 (Feb. 2019).

Mei et al., "Triple carbon coated LiFePO4 composite with hierarchical conductive architecture as high-performance cathode for Li-ion batteries", Electrochimica Acta 153, pp. 523-530 (2015).

U.S. Appl. No. 17/659,369, Notice of Allowance dated May 21, 2025 (9 pages).

Notice of Allowance, U.S. Appl. No. 17/659,370, dated Dec. 19, 2025 (8 pages).

(56) References Cited

OTHER PUBLICATIONS

Notice of Allowance, U.S. Appl. No. 17/659,371, dated Dec. 30, 2025 (7 pages).

* cited by examiner (a)

(b)

(a)

(b)

(a)

(b)

GRAPHENE-DOPED LITHIUM IRON PHOSPHATE ACTIVE MATERIAL AND METHOD FOR PREPARING THE SAME

TECHNICAL FIELD

The present application relates to a positive electrode active material and a method for preparing the same, and more particularly, to a positive electrode active material including a compound of lithium, iron, phosphorus, and oxygen and a method for preparing the same.

BACKGROUND ART

Small IT devices such as smart phones, etc., took lead in initial growth of a global secondary battery market, but recently, a secondary battery market for vehicles is rapidly growing with the growth of an electric vehicle market.

Secondary batteries for vehicles are leading the growth of the electric vehicle market while enabling mass production through product standardization and achieving low price and stable performance through technology development, and the market is rapidly expanding as a short mileage, which was pointed out as a limitation of electric vehicles, has been resolved by improving battery performance.

With an explosive increase in the demand for secondary batteries, next-generation secondary batteries are also being actively developed to meet the safety issues of secondary batteries and the demand for increased battery capacity.

For example, Korean Unexamined Patent Registration Publication No. 10-1808373 discloses a positive electrode active material for a lithium secondary battery, which includes a core including a particle of lithium transition metal oxide represented by equation 1 below and a coating layer located on a surface of the core, in which the coating layer includes niobium (Nb) and the particle of lithium transition metal oxide of above formula 1 is doped with tungsten, in which the tungsten is distributed in a concentration gradient manner that decreases from the surface of the particle of lithium transition metal oxide to a center thereof: [Equation 1] Li $(Ni_{1-x-y-z}Mn_xCo_yM_z)_aW_{l-a}O_2$ (in above formula 1, M is selected from the group consisting of Al, Fe, V, Cr, Ti, Ta, Mg and Mo, and x, y, z and a are $1 \leq x+y+z \leq 1$, $0 \leq x < a < 1$ as an atomic fraction of independent elements, respectively.).

DISCLOSURE

Technical Problem

One technical object of the present application is to provide a positive electrode active material and a method for preparing the same.

Another technical object of the present application is to provide a positive electrode active material including a compound of lithium, iron, phosphorus, and oxygen and a method for preparing the same.

Still another technical object of the present application is to provide a positive electrode active material capable of enhancing charge/discharge properties and a method for preparing the same.

Still another technical object of the present application is to provide a positive electrode active material capable of enhancing high-speed charge/discharge properties and a method for preparing the same.

Still another technical object of the present application is to provide a positive electrode active material having high stability and long life and a method for preparing the same.

Still another technical object of the present application is to provide a positive electrode active material, which is easily mass-produced, and a method for preparing the same.

The technical objects of the present application are not limited to the above.

Technical Solution

To solve the above technical objects, the present application may provide a method for preparing a positive electrode active material.

According to one embodiment, the method for preparing a positive electrode active material may include: providing a lithium precursor, an iron precursor, a phosphorus precursor, and a base solvent; mixing the base solvent and the lithium precursor to prepare a first source, mixing the base solvent and the iron precursor to prepare a second source, and mixing the base solvent and the phosphorus precursor to prepare a third source; and mixing the first source, the second source, the third source, and a chelating agent and allowing a reaction to occur in the mixture by a heat treatment method to prepare a positive electrode active material including a compound of lithium, iron, phosphorus, and oxygen.

According to one embodiment, the chelating agent may include at least any one of pyrrole and citric acid, and a conversion of $Fe^{3+}$ into $Fe^{2+}$ may be suppressed to suppress a production of $Fe(OH)_2$ by the chelating agent.

According to one embodiment, the lithium precursor may include at least any one of $Li_2CO_3$, LiOH $H_2O$, $LiH_2PO_4$, $Li(CH_3C00)$, LiCl, $LiNO_3$, lithium citrate ($Li_3C_6H_5O_7$) or LiI.

According to one embodiment, the iron precursor may include at least any one of $Fe(NO_3)_3$, $FeSO_4$, $Fe_2O_3$, $FeCl_2$ $4H_2O$, $FePO_4$, $FeC_6H_5O_7$, iron acetate, and iron citrate ($FeC_6H_6O_7$).

According to one embodiment, the phosphorus precursor may include at least any one of $C_7H_{11}NO_7P_2$, $C_6H_{18}O_{24}P_6$, $(NH_4)_2HPO_4$, $H_3PO_4$, or $LiH_2PO_4$.

According to one embodiment, the base solvent may include N-methyl-2-pyrrolidone (NMP).

According to one embodiment, the base solvent may further include ethylene glycol and deionized water in addition to NMP, and a volume ratio of ethylene glycol and deionized water may be higher than a volume ratio of the NMP in the base solvent.

According to one embodiment, the mixing of the first source, the second source, the third source, and a chelating agent may include: preparing an intermediate product by mixing and reacting the second source, the third source, and the chelating agent; and mixing and reacting the intermediate product and the first source.

To solve the above technical objects, the present application may provide a lithium secondary battery.

According to one embodiment, the lithium secondary battery may include a positive electrode having a positive electrode active material including a compound of lithium, iron, phosphorus, and oxygen, a negative electrode on the positive electrode, and a solid electrolyte between the positive electrode and the negative electrode.

According to one embodiment, the solid electrolyte may include a compound in which a cation and an anion are bound.

According to one embodiment, the cation may include at least any one of thiophenium, thiazolium, phosphoranium, oxathiolanium, or thiazolidinium, and the anion may include at least any one of fluorohydrogenate, cyano(nitroso)methanide, or tetrazolidine.

To solve the above technical objects, the present application may provide a positive electrode active material.

According to one embodiment, the positive electrode active material may include a compound of lithium, iron, phosphorus, and oxygen, in which the positive electrode active material has a first crystallinity in a state before charging and discharging of a lithium secondary battery including the positive electrode active material, and has a second crystallinity in a state after charging and discharging of the lithium secondary battery, in which the second crystallinity is higher than the first crystallinity.

According to one embodiment, the first crystallinity and the second crystallinity of the positive electrode active material may be confirmed by using XRD.

According to one embodiment, the second crystallinity may be confirmed by using XRD after charging and discharging of the lithium secondary battery including a solid electrolyte having a compound in which a cation and an anion are bound.

To solve the above technical objects, the present application may provide a method for preparing a functional positive electrode active material.

According to one embodiment, the method for preparing a functional positive electrode active material may include: providing a first stock solution in which a base positive electrode active material including a compound of lithium, iron, phosphorus, and oxygen is dispersed in a first solvent; providing a second stock solution in which graphene powder is dispersed in a second solvent; and preparing a functional positive electrode active material in which the graphene powder is doped into the base positive electrode active material by mixing and heat-treating the first stock solution and the second stock solution.

According to one embodiment, the providing of the second stock solution may include: preparing a graphene colloid having the graphene powder by mixing the graphene powder with an oxidizing agent and heat-treating the mixture; obtaining the graphene powder from the graphene colloid; and dispersing the graphene powder in the second solvent.

According to one embodiment, the oxidizing agent may be hydrogen peroxide.

According to one embodiment, the first solvent and the second solvent may be the same solvent.

According to one embodiment, the first solvent and the second solvent may include N-methyl-2-pyrrolidone (NMP).

To solve the above technical objects, the present application may provide a functional positive electrode active material.

According to one embodiment, the functional positive electrode active material may include a base positive electrode active material having a compound of lithium, iron, phosphorus, and oxygen, and graphene powder doped into the base positive electrode active material, in which a ratio ($I_D/I_G$) value of intensity of a D band to intensity of a G band is greater than 1.98 and less than 3.26 when measuring the Raman spectrum.

According to one embodiment, the graphene powder may be 1 at % or more and less than 3 at %.

To solve the above technical objects, the present application may provide a lithium secondary battery.

According to one embodiment, the lithium secondary battery may include a positive electrode having a functional positive electrode active material according to the embodiment described above, a negative electrode on the positive electrode, and a solid electrolyte between the positive electrode and the negative electrode, in which the solid electrolyte may include a compound in which a cation and an anion are bound.

To solve the above technical objects, the present application may provide a method for preparing a functional positive electrode active material.

According to one embodiment, the method for preparing a functional positive electrode active material may include: providing a lithium precursor, an iron precursor, a phosphorus precursor, and a base solvent; mixing the base solvent and the lithium precursor to prepare a first source, mixing the base solvent and the iron precursor to prepare a second source, and mixing the base solvent and the phosphorus precursor to prepare a third source; and mixing the first source, the second source, the third source, and a chelating agent and allowing a reaction to occur in the mixture by a heat treatment method to prepare a functional positive electrode active material in which graphitic carbon is coated on a surface of a base positive electrode active material containing a compound of lithium, iron, phosphorus, and oxygen.

According to one embodiment, a conversion of $Fe^{3+}$ into $Fe^{2+}$ may be suppressed to suppress a production of $Fe(OH)_2$ by the chelating agent, and the carbon contained in the chelating agent may be heat-treated to form the graphitic carbon.

According to one embodiment, the first source, the second source, the third source, and the chelating agent may be mixed, and then heat-treated in a nitrogen atmosphere.

According to one embodiment, the method for preparing a functional positive electrode active material may include: providing a lithium precursor, an iron precursor, a phosphorus precursor, and a base solvent; mixing the base solvent and the lithium precursor to prepare a first source, mixing the base solvent and the iron precursor to prepare a second source, and mixing the base solvent and the phosphorus precursor to prepare a third source; and mixing the first source, the second source, the third source, a chelating agent and a graphene source and allowing a reaction to occur in the mixture by a heat treatment method to prepare a functional positive electrode active material in which graphene is grown on a surface of a base positive electrode active material containing a compound of lithium, iron, phosphorus, and oxygen.

According to one embodiment, the mixing of the first source, the second source, the third source, the chelating agent, and a graphene source may include: preparing an intermediate product by mixing and reacting the second source, the third source, the chelating agent, and the graphene source; and mixing and reacting the intermediate product and the first source.

According to one embodiment, the preparing of an intermediate product may include mixing the second source, the third source, and the graphene source and allowing a reaction to occur in the mixture by a heat treatment, and adding the chelating agent.

Advantageous Effects

The method for preparing a positive electrode active material according to an embodiment of the present application can include: mixing abase solvent and a lithium precursor to prepare a first source, mixing the base solvent and an iron precursor to prepare a second source, and mixing the base solvent and a phosphorus precursor to prepare a third source; and mixing the first source, the second source, the third source, and a chelating agent and allowing a reaction to occur in the mixture by a heat treatment method to prepare a positive electrode active material including a compound of lithium, iron, phosphorus, and oxygen.

The positive electrode active material including a compound of lithium, iron, phosphorus, and oxygen may have a long lifespan and high stability in high-speed charge/discharge, and may be prepared in high yield by using inexpensive raw materials. Accordingly, the method for preparing a positive electrode active material with an easy mass production and less production cost and time can be provided.

In addition, the positive electrode active material can have high charge/discharge properties by configuring a lithium secondary battery together with the solid electrolyte in which a cations and an anion are bound.

Furthermore, the functional positive electrode active material according to an embodiment of the present application can include a base positive electrode active material and graphene powder coated on the base positive electrode active material. During charging and discharging of a lithium secondary battery including the functional positive electrode active material, the graphene powder can not only enhance the conductivity of a positive electrode, but also function as an active material that occludes and desorbs lithium ions along with the base positive electrode active material, thereby enhancing a charge/discharge capacity. Accordingly, the functional positive electrode active material can have a high charge/discharge capacity without using nickel, cobalt, etc., and may also have high stability against high-speed charge/discharge and a long lifespan.

MODE FOR INVENTION

Figure 1:
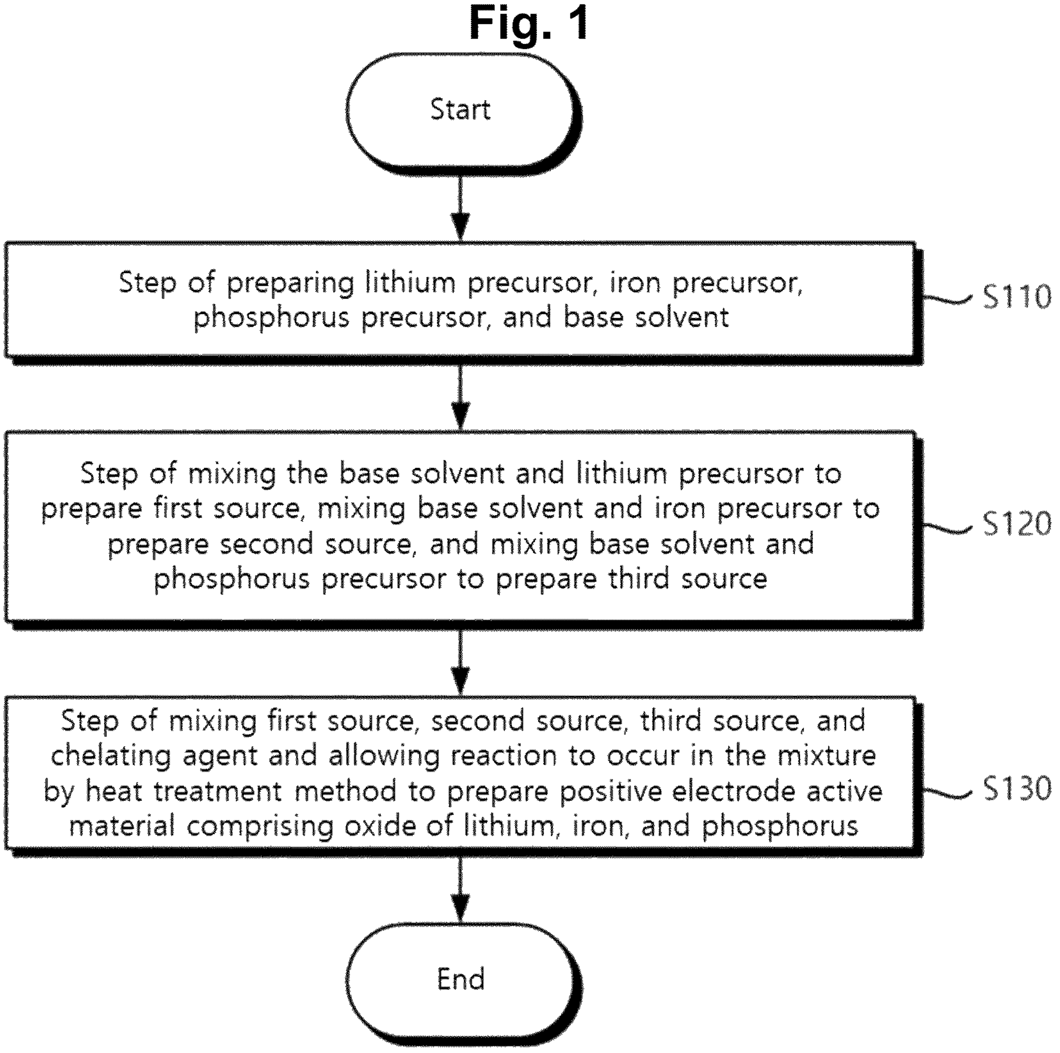
FIG. 1 is a flowchart for explaining a method for preparing a positive electrode active material according to an embodiment of the present application.

Hereinafter, preferred embodiments of the present application will be described in detail with reference to the accompanying drawings. However, the technical idea of the present application is not limited to the embodiments described herein and may be implemented in other forms. Rather, the embodiments introduced herein are provided to sufficiently deliver the spirit of the present application to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. These terms are used only to distinguish one component from another component. Accordingly, an element mentioned as a first element in one embodiment may be mentioned as a second element in another embodiment. The embodiments described and illustrated herein also include their complementary embodiments. Further, the term “and/or” in the specification is used to include at least one of the elements enumerated in the specification.

In the specification, the terms of a singular form may include plural forms unless otherwise specified. Further, the terms “including” and “having” are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present application, a detailed description of known functions or configurations incorporated herein will be omitted when it may make the subj ect matter of the present application unnecessarily unclear.

FIG. 1 is a flowchart for explaining a method for preparing a positive electrode active material according to an embodiment of the present application.

Referring to FIG. 1, a lithium precursor, an iron precursor, a phosphorus precursor, and a base solvent may be provided (S110).

According to one embodiment, the lithium precursor may include at least any one of $Li_2CO_3$, LiOH $H_2O$, $LiH_2PO_4$, $Li(CH_3COO)$, LiCl, $LiNO_3$, lithium citrate ($Li_3C_6H_5O_7$) or LiI, the iron precursor may include at least any one of Fe $(NO_3)_3$, $FeSO_4$, $Fe_2O_3$, $FeCl_2$ $4H_2O$, $FePO_4$, $FeC_6H_5O_7$, iron acetate, or iron citrate ($FeC_6H_6O_7$), and the phosphorus precursor may include at least any one of $C_7H_{11}NO_7P_2$, $C_6H_{18}O_{24}P_6$, $(NH_4)$ $_2HPO_4$, $H_3PO_4$, or $LiH_2PO_4$.

The base solvent may be a mixed solvent in which a plurality of solutions are mixed. According to one embodiment, the base solvent may include N-methyl-2-pyrrolidone (NMP). In this case, the base solvent may further include ethylene glycol and deionized water in addition to the NMP, and a volume ratio of ethylene glycol and deionized water may be higher than a volume ratio of the NMP in the base solvent. In addition, a volume ratio of ethylene glycol and deionized water maybe the same. Accordingly, a viscosity of the base solvent and a solubility of the lithium precursor, the iron precursor, and the phosphorus precursor may be adjusted. Specifically, a volume ratio of ethylene glycol and deionized water may be 0.5 or more and 2 or less, and a volume ratio of the NMP may be 0.5 or more and 2 or less. For example, a volume ratio of ethylene glycol, deionized water, and the NMP may be 1:1:0.5.

As described above, the base solvent used in a process of preparing the positive electrode active material may include the NMP. Accordingly, a positive electrode active material including a compound of lithium, iron, phosphorus, and oxygen, to be described later, may be uniformly prepared in a small size.

Unlike the embodiment of the present application described above, if the base solvent does not contain the NMP, the positive electrode active material may not have a uniform size, and thus the charge/discharge properties and lifespan of the secondary battery including the positive electrode active material maybe deteriorated.

However, in the method of preparing the positive electrode active material according to the embodiment of the present application, the base solvent may include the NMP, and thus the positive electrode active material may be uniformly prepared in a small size, thereby enhancing a charge/discharge capacity of the secondary battery including the positive electrode active material and providing a long lifespan thereof.

Unlike the above, according to another embodiment, the base solvent may include at least any one of polyol, n-hexane, acetonitrile, formaldehyde, tetraethyleneglycol, glycerol, or ethanol.

The base solvent and the lithium precursor may be mixed to prepare a first source, the base solvent and the iron precursor may be mixed to prepare a second source, and the base solvent and the phosphorus precursor may be mixed to prepare a third source (S120).

In other words, as described above, the lithium precursor, the iron precursor, the phosphorus precursor, and the base solvent may not be mixed at once, but the base solvent may be accommodated in three containers, and the lithium precursor, the iron precursor, and the phosphorus precursor may be mixed in three containers, respectively, so as to prepare the first to third sources.

Lithium may function as a reducing agent in a reaction process to be described later and may be consumed, and thus lithium may be used in excess. According to one embodiment, a stoichiometric ratio of lithium, iron, and phosphorus may be 3:1:1 in the first to third sources. Accordingly, a positive electrode active material including $LiFePO_4$ to be described later may be easily prepared.

The first source, the second source, the third source, and a chelating agent may be mixed to allow a reaction to occur in the mixture by a heat treatment method to prepare a positive electrode active material including a compound of lithium, iron, phosphorus, and oxygen (S130).

According to one embodiment, the mixing of the first source, the second source, the third source, and the chelating agent may include: preparing an intermediate product by mixing and reacting the second source, the third source, and the chelating agent; and mixing and reacting the intermediate product and the first source. In other words, the intermediate product may be first prepared by mixing the chelating agent with the second source including iron and the third source including phosphorus. The intermediate product may be a compound containing iron and phosphorus . After that, the positive electrode active material including a compound of lithium, iron, phosphorus, and oxygen may be prepared by reacting the first source including lithium with the intermediate product.

In addition, according to one embodiment, the preparing of an intermediate product may include mixing the second source containing iron and the third source containing phosphorus and allowing a reaction to occur in the mixture by a heat treatment, and then adding the chelating agent.

A conversion of $Fe^{3+}$ into $Fe^{2+}$ may be suppressed to suppress a production of $Fe(OH)_2$ by the chelating agent in a process of preparing the positive electrode active material. Accordingly, the positive electrode active material including $LiFePO_4$, which is a compound of lithium, iron, phosphorus, and oxygen, may be easily prepared.

Unlike the embodiment of the present application described above, in case of not adding the chelating agent, $Fe^{3+}$ may be converted into $Fe^{2+}$ to produce $Fe(OH)_2$ and not to easily prepare the positive electrode active material including $LiFePO_4$, thereby remarkably reducing a production yield.

According to the embodiment of the present application as described above, however, the chelating agent may be added after mixing the second source containing iron and the third source containing phosphorus and allowing a reaction to occur in the mixture by a heat treatment, thereby enhancing a manufacturing yield of the positive electrode active material including $LiFePO_4$, which is a compound of lithium, iron, phosphorus, and oxygen, reducing a production cost, and facilitating a mass production.

The positive electrode active material prepared according to the embodiment of the present application may include a compound of lithium, iron, phosphorus, and oxygen as described above. In case of manufacturing a lithium secondary battery by using the positive electrode active material, crystallinity may not be deteriorated, but rather may be enhanced, even if charging and discharging of the lithium secondary battery is performed.

In other words, when the positive electrode active material has a first crystallinity in an initial state, that is, before charging and discharging of the lithium secondary battery including the positive electrode active material, and the positive electrode active material has a second crystallinity after charging and discharging of the lithium secondary battery including the positive electrode active material (for example, after 500 times of charging and discharging), the second crystallinity may be higher than the first crystallinity. According to one embodiment, the first crystallinity and the second crystallinity may be confirmed by using an XRD analysis.

In addition, the lithium secondary battery may use a solid electrolyte, and in this case, the solid electrolyte may include a compound in which a cation and an anion are bound. The kind of the cation and the anion will be described later.

As such, the crystallographic properties, in which the crystallinity of the positive electrode active material does not decrease, but rather increases after charging and discharging, may be an intrinsic material property resulting from a process of preparing the positive electrode active material and/or a combination of the positive electrode active material and the solid electrolyte according to the embodiment of the present application as described above.

According to an embodiment of the present application, the first source in which the base solvent and the lithium precursor are mixed, the second source in which the base solvent and the iron precursor are mixed, the third source in which the base solvent and the phosphorus precursor are mixed, and the chelating agent maybe reacted to prepare the positive electrode active material including a compound of lithium, iron, phosphorus, and oxygen. The positive electrode active material may have a long lifespan and high stability in high-speed charging and discharging. In addition, the positive electrode active material may be prepared in high yield by using inexpensive raw materials, and thus a method for preparing a positive electrode active material with an easy mass production and less production cost and time may be provided.

In addition, the positive electrode active material may have high charge/discharge properties by configuring a lithium secondary battery together with the solid electrolyte in which a cation and an anion are bound.

Hereinafter, a functional positive electrode active material including the positive electrode active material prepared by the method described with reference to FIG. 1 as a base positive electrode active material and a method for preparing the same will be described.

Figure 2:
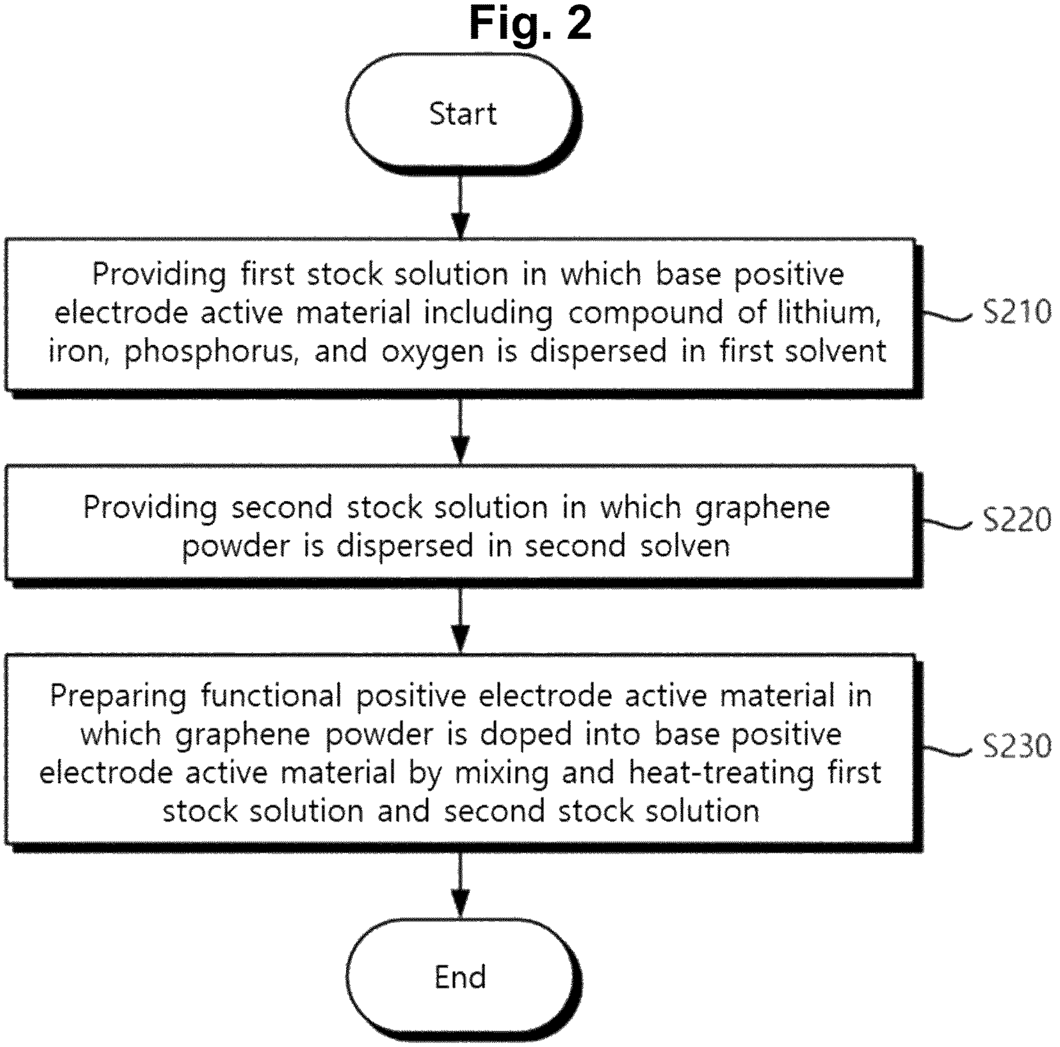
FIG. 2 is a flowchart for explaining a method for preparing a functional positive electrode active material according to a first embodiment of the present application.

FIG. 2 is a flowchart for explaining a method for preparing a functional positive electrode active material according to a first embodiment of the present application.

Referring to FIG. 2, a first stock solution, in which a base positive electrode active material including a compound of lithium, iron, phosphorus, and oxygen is dispersed in a first solvent, will be provided (S210).

According to one embodiment, the preparing of a base positive electrode active material may include as described with reference to FIG. 1: providing a lithium precursor, an iron precursor, a phosphorus precursor, and a base solvent; mixing the base solvent and the lithium precursor to prepare a first source, mixing the base solvent and the iron precursor to prepare a second source, and mixing the base solvent and the phosphorus precursor to prepare a third source; and mixing the first source, the second source, the third source, and a chelating agent and allowing a reaction to occur in the mixture by a heat treatment method to prepare a positive electrode active material. In other words, the positive electrode active material described with reference to FIG. 1 may be used as the base positive electrode active material.

The base positive electrode active material prepared by the above-described method may be dispersed in the first solvent. The first solvent may include, for example, the NMP.

A second stock solution in which graphene powder is dispersed in the second solvent may be provided (S220).

The second solvent may be the same as the first solvent. As described above, for example, the first solvent may include the NMP.

The graphene powder maybe synthesized from the graphite powder or prepared by a method of peeling off the graphite powder. Specifically, according to one embodiment, the graphene powder may be prepared by a method of treating the graphite powder with $H_2SO_4$, adding and reacting $KMnO_4$, terminating the reaction with $H_2O_2$ and deionized water, and then washing with HCl. Alternatively, according to another embodiment, the graphene powder may be prepared by peeling off the graphite powder with an electrolytic solution containing $H_2SO_4$ and deionized water as a working electrode.

The providing of a second stock solution may include: preparing a graphene colloid having the graphene powder by mixing the graphene powder with an oxidizing agent (for example, $H_2O_2$) and heat-treating the mixture; obtaining the graphene powder from the graphene colloid; and dispersing the graphene powder in the second solvent. Accordingly, the graphene powder may not be agglomerated, but may be easily and uniformly dispersed in the second solvent. Thus, as will be described later, the graphene powder may be uniformly doped on a surface of the base positive electrode active material, and thus a functional positive electrode active material having high reliability, long lifespan, and high charge/discharge properties may be provided.

The functional positive electrode active material, in which the graphene powder is doped into the base positive electrode active material, may be prepared by mixing and heat-treating the first stock solution and the second stock solution (S230).

According to one embodiment, the second stock solution having the graphene powder may be added dropwise to the first stock solution having the base positive electrode active material and heat-treated, and thus the graphene powder may be doped into the base positive electrode active material.

The functional positive electrode active material according to an embodiment of the present application may include the base positive electrode active material and the graphene powder coated on the base positive electrode active material. During charging and discharging of a lithium secondary battery including the functional positive electrode active material, the graphene powder may not only enhance the conductivity of a positive electrode, but also function as an active material that occludes and desorbs lithium ions along with the base positive electrode active material, thereby enhancing a charge/discharge capacity. Accordingly, the functional positive electrode active material may have a high stability against high-speed charge/discharge, a high charge/discharge capacity, and a long lifespan even without using nickel, cobalt, etc., According to a second embodiment of the present application, a functional positive electrode active material and a method for preparing the same will be described.

Figure 3:
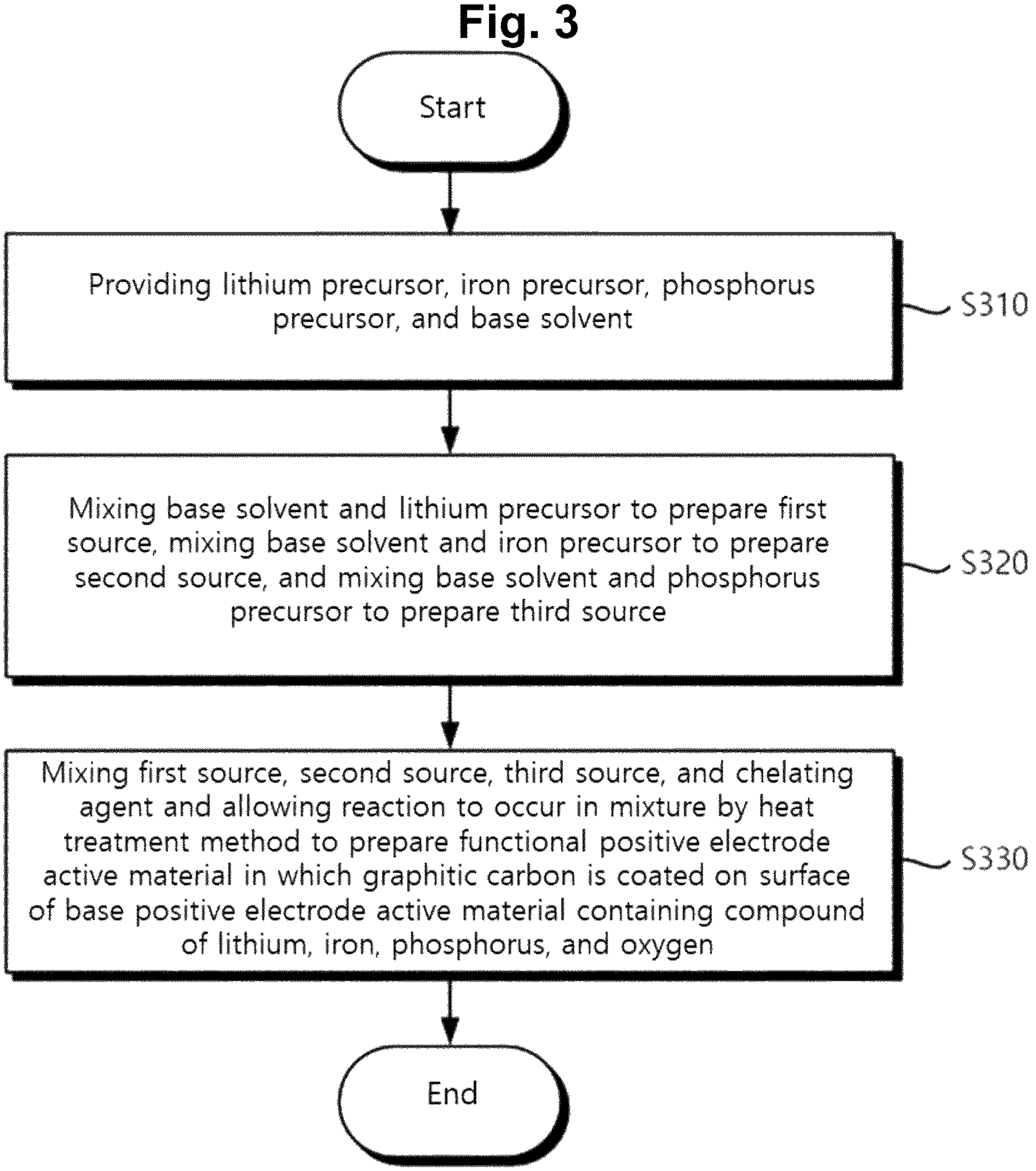
FIG. 3 is a flowchart for explaining a method for preparing a functional positive electrode active material according to a second embodiment of the present application.

FIG. 3 is a flowchart for explaining a method for preparing a functional positive electrode active material according to a second embodiment of the present application.

Referring to FIG. 3, a lithium precursor, an iron precursor, a phosphorus precursor, and a base solvent will be provided (S310).

The lithium precursor, the iron precursor, the phosphorus precursor, and the base solvent may be prepared by the same method as that of preparing the base positive electrode active material described with reference to FIG. 2.

The base solvent and the lithium precursor may be mixed to prepare a first source, the base solvent and the iron precursor may be mixed to prepare a second source, and the base solvent and the phosphorus precursor may be mixed to prepare a third source (S320).

The first source, the second source, and the third source may be prepared by the same method as that of preparing the base positive electrode active material described with reference to FIG. 2.

The first source, the second source, the third source, and a chelating agent may be mixed to allow a reaction to occur in the mixture by a heat treatment method to prepare a functional positive electrode active material in which graphitic carbon is coated on a surface of a base positive electrode active material containing a compound of lithium, iron, phosphorus, and oxygen (S330).

The same method as that of preparing the base positive electrode active material described with reference to FIG. 2 may be performed, except that a concentration of the chelating agent may be higher. In other words, a concentration ratio of the chelating agent and the Fe source (e.g., 1:1) in the method for preparing the functional positive electrode active material according to the second embodiment of the present application may be higher than a concentration ratio of the chelating agent and the Fe source (e.g., 0.5:1) in the method for preparing the base positive electrode active material described with reference to FIG. 2. In other words, by the same method as the method for preparing the base positive electrode active material described with reference to FIG. 2, the second source, the third source, and the chelating agent may be mixed and reacted to prepare an intermediate product, and the intermediate product and the first source may be mixed and heat-treated in a nitrogen atmosphere (e.g., 600° C.) to prepare the functional positive electrode active material. In this case, the preparing of an intermediate product may include mixing the second source containing iron and the third source containing phosphorus and allowing a reaction to occur in the mixture by a heat treatment, and then adding the chelating agent at a high concentration.

Accordingly, a conversion of $Fe^{3+}$ into $Fe^{2+}$ may be suppressed to suppress a production of $Fe(OH)_2$ by the chelating agent, and the carbon contained in the chelating agent may be also heat-treated to form the graphitic carbon.

According to a third embodiment of the present application, a functional positive electrode active material and a method for preparing the same will be described.

Figure 4:
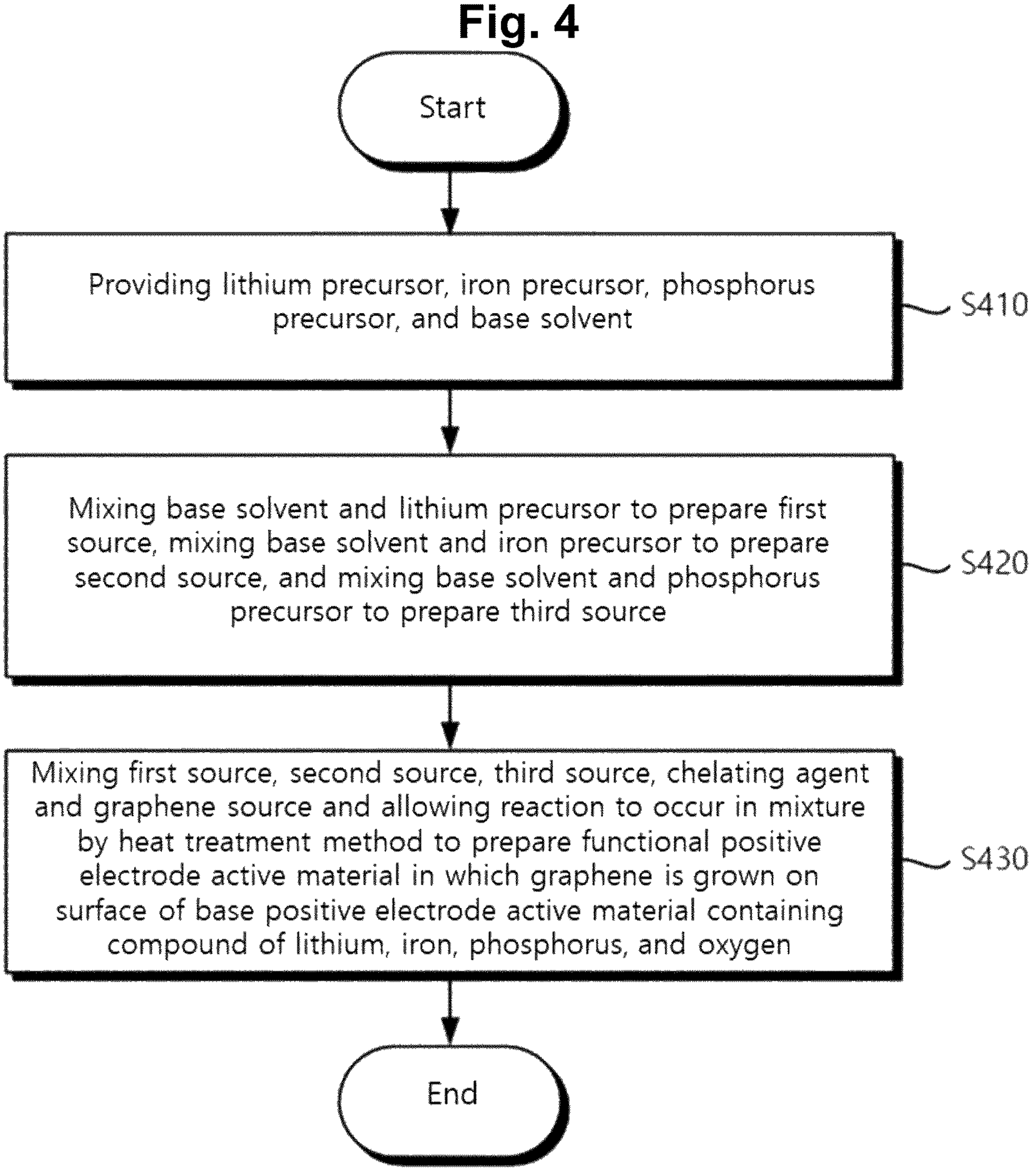
FIG. 4 is a flowchart for explaining a method for preparing a functional positive electrode active material according to a third embodiment of the present application.

FIG. 4 is a flowchart for explaining a method for preparing a functional positive electrode active material according to a third embodiment of the present application.

Referring to FIG. 4, a lithium precursor, an iron precursor, a phosphorus precursor, and a base solvent will be provided (S410).

The lithium precursor, the iron precursor, the phosphorus precursor, and the base solvent may be prepared by the same method as that of preparing the base positive electrode active material described with reference to FIG. 2.

The base solvent and the lithium precursor may be mixed to prepare a first source, the base solvent and the iron precursor may be mixed to prepare a second source, and the base solvent and the phosphorus precursor may be mixed to prepare a third source (S420).

The first source, the second source, and the third source may be prepared by the same method as that of preparing the base positive electrode active material described with reference to FIG. 2.

The first source, the second source, the third source, a chelating agent and a graphene source may be mixed to allow a reaction to occur in the mixture by a heat treatment method to prepare a functional positive electrode active material in which graphene is grown on a surface of a base positive electrode active material containing a compound of lithium, iron, phosphorus, and oxygen.

Unlike the method for preparing the base positive electrode active material described with reference to FIG. 2, the graphene source may be further added. The graphene source may be one in which graphene powder is dispersed in a solvent as described with reference to FIG. 2. In this case, the solvent may be a mixture of deionized water and ethyl alcohol.

The mixing of the first source, the second source, the third source, a chelating agent, and a graphene source may include:

preparing an intermediate product by mixing and reacting the second source, the third source, the chelating agent, and the graphene source; and mixing and reacting the intermediate product and the first source. In other words, the intermediate product may be first prepared by mixing the second source including iron, the third source including phosphorus, and the graphene source with the chelating agent. The intermediate product may be a compound containing iron, phosphorus and graphene. After that, the functional positive electrode active material, in which the graphene is grown on a surface of the base positive electrode active material including a compound of lithium, iron, phosphorus, and oxygen, may be prepared by reacting the first source including lithium with the intermediate product.

In addition, according to one embodiment, the preparing of an intermediate product may include mixing the second source containing iron, the third source containing phosphorus, and the graphene source and allowing a reaction to occur in the mixture by a heat treatment, and then adding the chelating agent.

The positive electrode active material and the functional positive electrode active material prepared by the method described above with reference to FIGS. 1 to 4 maybe used as a positive electrode of a lithium secondary battery together with a solid electrolyte. Hereinafter, a secondary battery according to an embodiment of the present application will be described with reference to FIG. 5.

Figure 5:
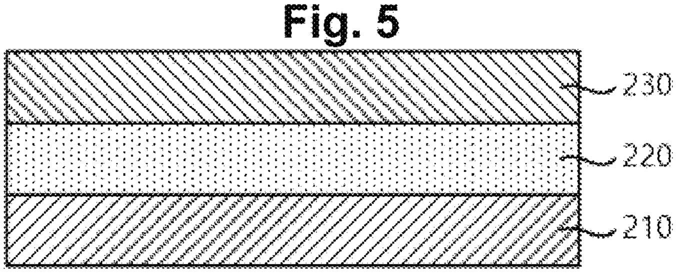
FIG. 5 is a view for explaining a secondary battery according to an embodiment of the present application.

FIG. 5 is a view for explaining a secondary battery according to an embodiment of the present application.

Referring to FIG. 5, the secondary battery according to an embodiment of the present application may include a negative electrode 210, a solid electrolyte 220, and a positive electrode 230.

The negative electrode 210 may include various materials such as a carbon-based material, silicon, lithium, etc.

For example, the positive electrode 230 may include the positive electrode active material including a compound of lithium, iron, phosphorus, and oxygen as described with reference to FIG. 1. Alternatively, the positive electrode 230 may include the functional positive electrode active material containing a compound of lithium, iron, phosphorus, and oxygen as described with reference to FIGS. 2 to 4. In other words, the positive electrode active material, a binder, and a conductive material maybe coated on a current collector to provide the positive electrode 230.

The solid electrolyte 220 may be a compound in which a cation and an anion are bound.

Specifically, the cation may include at least any one of thiophenium represented by <Formula 1>, thiazolium represented by <Formula 2>, phospholanium represented by <Formula 3>, or oxathiolanium represented by <Formula 4> or <Formula 5>, or thiazolidinium represented by <Formula 6>. In <Formula 1> to <Formula 6>, R1 may be an alkyl group.

<Formula 1>

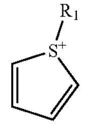

<Formula 2>

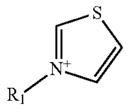

<Formula 3>

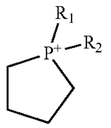

<Formula 4>

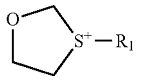

<Formula 5>

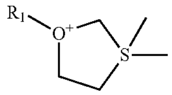

<Formula 6>

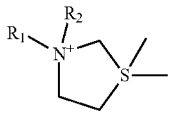

Specifically, the anion may include fluorohydrogenate represented by <Formula 7>.

<Formula 7>

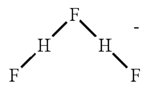

Alternatively, the anion may include cyano(nitroso) methanide or tetrazolidine.

According to another embodiment, the solid electrolyte 220 may be an oxide, sulfide, or polymer-based material, as described above.

Hereinafter, a positive electrode active material prepared according to a specific experimental example of the present application, and results of evaluating properties will be described accordingly.

Fabrication of Positive Electrode Active Material and Lithium Secondary Battery according to Experimental Example 1-1

$Li_2CO_3$ was provided as a lithium precursor, a solution, in which risedronic acid ($C_7H_{11}NO_7P_2$) and phytic acid ($C_6H_{18}O_{24}P_6$) were mixed at a volume ratio of 1:1, was provided as a phosphorus precursor, and iron nitrate ($Fe(NO_3)_3$) was provided as an iron precursor.

A solution, in which ethylene glycol, deionized water and the NMP were mixed at a volume ratio of 1:1:0.5, was provided as a base solvent, the base solvent and the lithium precursor were mixed to prepare a first source, the base solvent and the iron precursor were mixed to prepare a second source, and the base solvent and the phosphorus precursor were mixed to prepare a third source, in which a stoichiometric ratio of lithium, iron, and phosphorus was 3:1:1.

The third source, in which the phosphorus precursor was mixed, was mixed in the second source, in which the iron precursor was mixed, and heat-treated at 60° C. for two hours to produce an intermediate product, which was then washed with ethanol and deionized water, and dried at 60° C. for three hours in a vacuum condition.

Pyrrole ($C_4H_5N$) and citric acid ($C_6H_8O_7$) were provided as the chelating agent, and the chelating agent was added so that a molar ratio of the chelating agent to an iron ion might reach 0.5:1.

After adding the chelating agent, the first source, in which the lithium precursor was mixed, was added dropwise, reacted at 150° C. for five hours in the atmosphere, purified, washed three times with deionized water and ethanol, and dried in a vacuum at 60° C. to prepare a $LiFePO_4$ positive electrode active material according to Experimental Example 1-1.

A positive electrode active material according to Experimental Example 1-1, carbon black, and the PVDF were mixed at 95:2.5:2.5(wt %) and coated on a current collector to prepare a positive electrode.

A lithium foil was provided as a negative electrode, and a solid electrolyte according to Experimental Example 8-3 to be described later was used as a solid electrolyte to prepare a lithium secondary battery according to Experimental Example 1-1.

Fabrication of Positive Electrode Active Material and Lithium Secondary Battery according to Experimental Example 1-2

The same method was performed as in Experimental Example 1-1, except that $LiFePO_4$ was purchased from *** and provided as a positive electrode active material according to Experimental Example 1-2, and a positive electrode active material according to Experimental Example 1-2, carbon black, and the PVDF were mixed at 8:1:1(wt %) to prepare a lithium secondary battery according to Experimental Example 1-2.

Fabrication of Positive Electrode Active Material and Lithium Secondary Battery according to Experimental Example 1-3

The same method was performed as in Experimental Example 1-1, except that $LiCoO_2$ was provided as a positive electrode active material according to Experimental Example 1-2, and a positive electrode active material according to Experimental Example 1-3, carbon black, and the PVDF were mixed at 8:1:1(wt %) to prepare a lithium secondary battery according to Experimental Example 1-3.

Providing of Positive Electrode Active Material according to Experimental Example 1-4

The same method was performed as in Experimental Example 1-1, except that $LiNi_{0.6}Co_{0.2}Mn_{0.2}O_2$ was provided as a positive electrode active material according to Experimental Example 1-3, and a positive electrode active material according to Experimental Example 1-4, carbon black, and the PVDF were mixed at 8:1:1(wt %) to prepare a lithium secondary battery according to Experimental Example 1-4.

Figure 6:
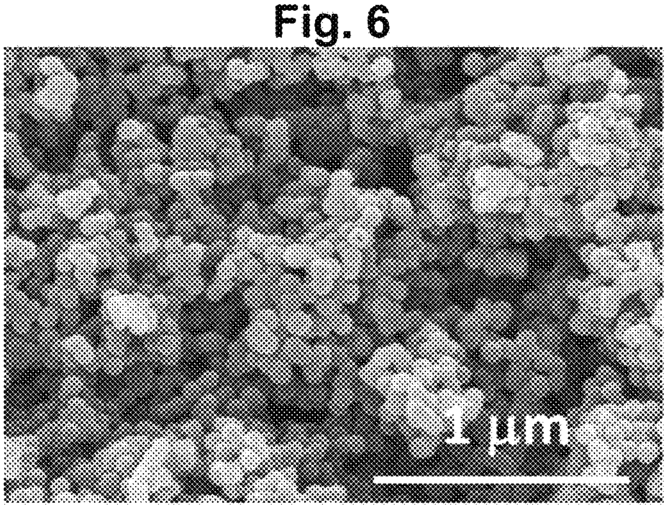
FIG. 6 is a view showing SEM pictures of a positive electrode active material according to Experimental Example 1-1 of the present application.
Figure 6:
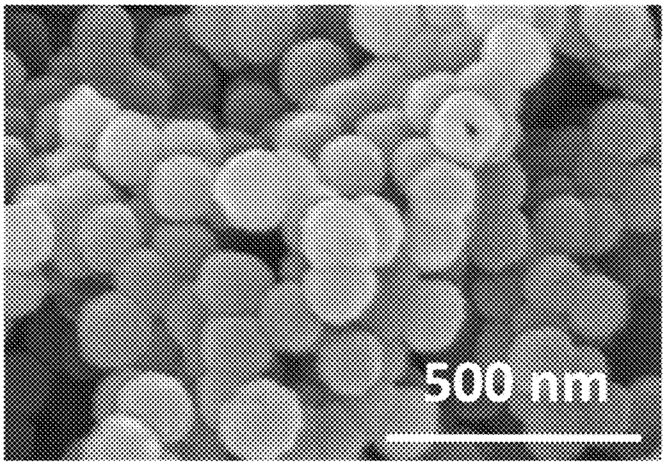

FIG. 6 is a view showing SEM pictures of a positive electrode active material according to Experimental Example 1-1 of the present application.

Figure 10:
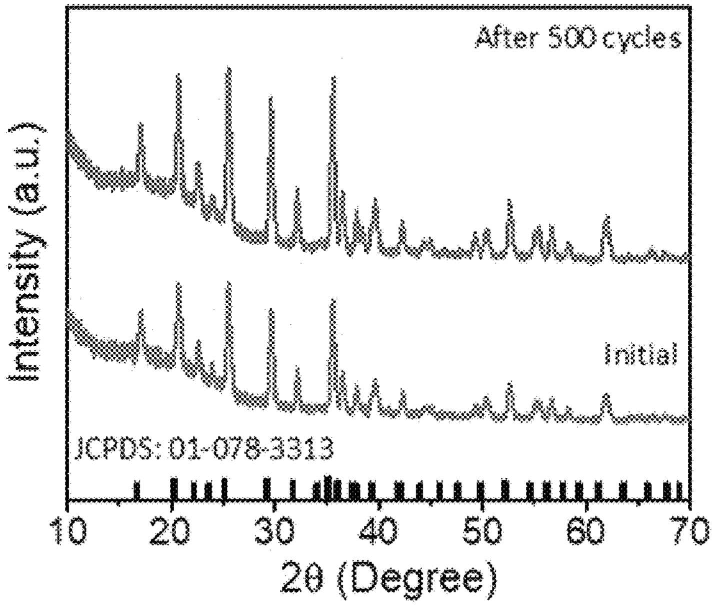
FIG. 10 is a view showing results of XRD measurement of a positive electrode active material according to Experimental Example 1-2 of the present application.

Referring to FIG. 6, SEM pictures were taken of a positive electrode active material according to Experimental Example 1-1. According to the embodiment of the present application, it can be confirmed that the $LiFePO_4$ positive electrode active material is prepared to have a uniform size. In particular, it can be confirmed that the inventive material has a uniformly small size and is prepared to be substantially spherical compared to commercial $LiFePO_4$ of Experimental Example 1-2 as shown in FIG. 10 to be described later.

Figure 7:
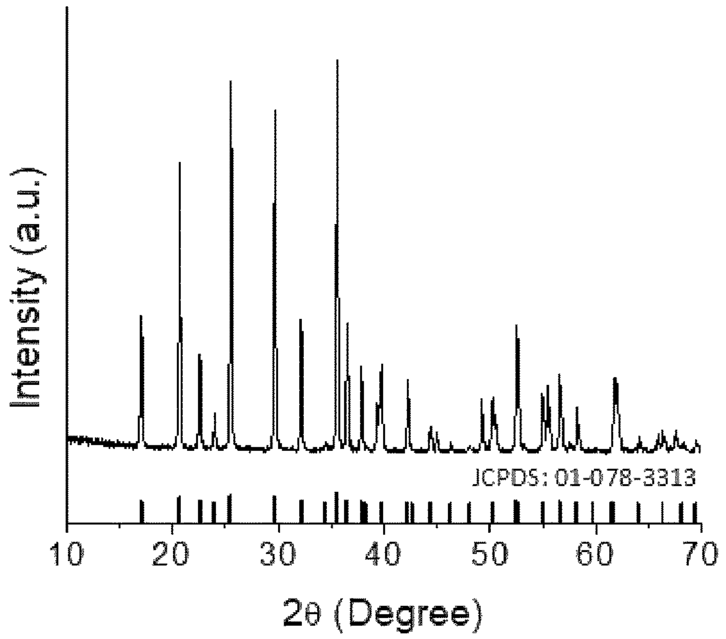
FIG. 7 is a view showing results of XRD measurement of a positive electrode active material according to Experimental Example 1-1 of the present application.

FIG. 7 is a view showing results of XRD measurement of a positive electrode active material according to Experimental Example 1-1 of the present application.

Referring to FIG. 7, an XRD measurement was performed for a positive electrode active material according to Experimental Example 1-1 of the present application. As shown in FIG. 7, it can be confirmed that a positive electrode active material having a $LiFePO_4$ composition is prepared.

Figure 8:
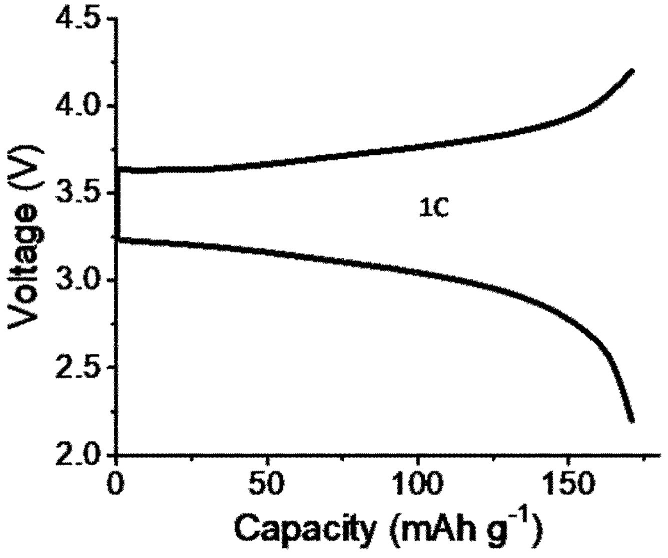
FIG. 8 is a graph for explaining charge/discharge properties of a lithium second battery according to Experimental Example 1-1 of the present application.

FIG. 8 is a graph for explaining charge/discharge properties of a lithium second battery according to Experimental Example 1-1 of the present application.

Referring to FIG. 8, charge/discharge was performed for a lithium secondary battery according to Experimental Example 1-1 under 1C condition. As shown in FIG. 8, it can be confirmed that the lithium secondary battery has a high capacity and is stably driven under the 1C condition.

Figure 9:
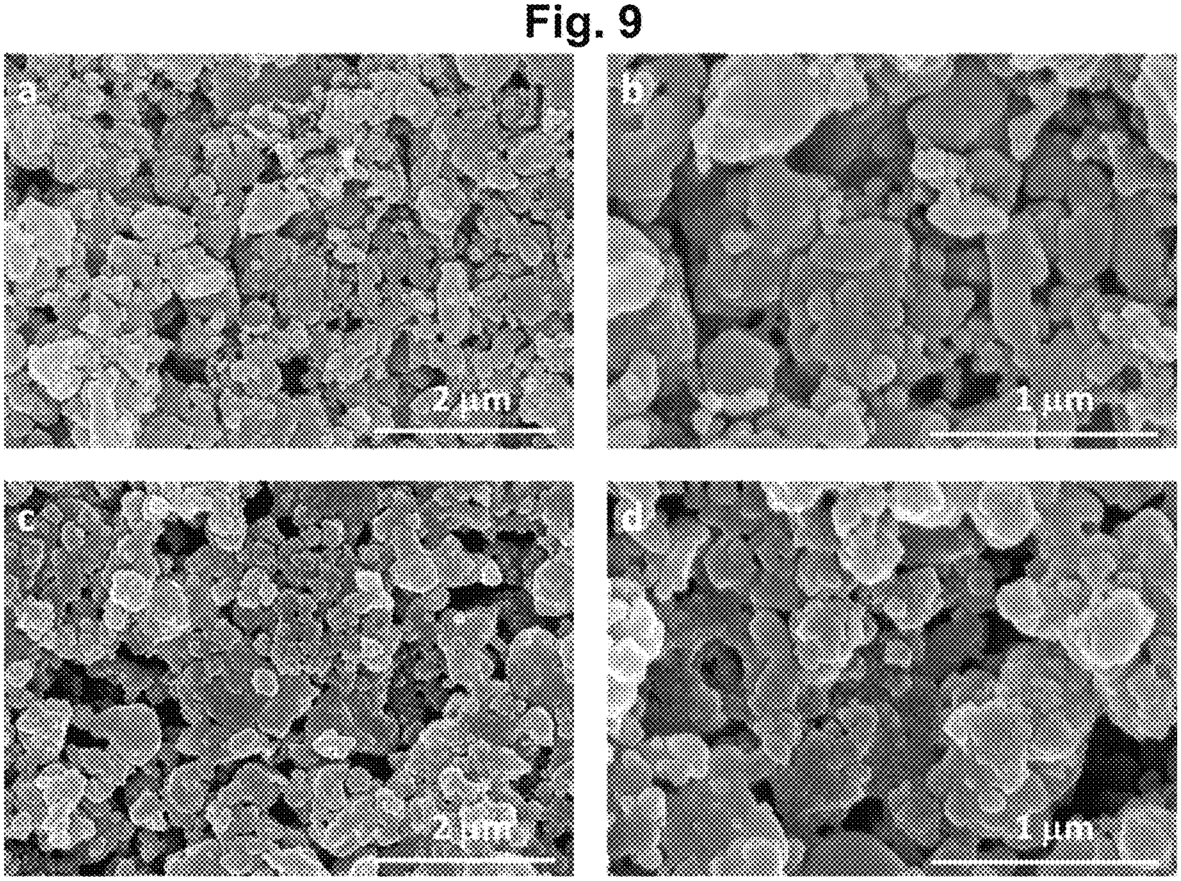
FIG. 9 is a view showing SEM pictures of a positive electrode active material according to Experimental Example 1-2 of the present application.

FIG. 9 is a view showing SEM pictures of a positive electrode active material according to Experimental Example 1-2 of the present application.

Referring to FIG. 9, SEM pictures were taken of a positive electrode active material according to Experimental Example 1-2. (a) and (b) of FIG. 9 are view showing SEM pictures of a positive electrode active material in an initial state before charging and discharging, and (c) and (d) of FIG. 9 are views showing SEM pictures of a positive electrode active material after 500 times of charging and discharging of the lithium secondary battery of Experimental Example 1-2 under 1C condition.

As can be understood from FIG. 9, due to a combination with a solid electrolyte in which a cation and an anion are bound along with a highly stable crystal structure of the $LiFePO_4$ positive electrode active material having an olivine crystal structure, it can be confirmed that the inventive material has substantially the same morphology as that of the initial state except occurrence of a fine aggregation even after 500 times of charge/discharge. In addition, it can be seen that the lithium secondary battery of Experimental Example 1-2 is driven without crystallographic deterioration of the positive electrode active material of Experimental Example 1-2, as the solid electrolyte, in which a cation and an anion are bound, is combined with the positive electrode active material of Experimental Example 1-2.

FIG. 10 is a view showing results of XRD measurement of a positive electrode active material according to Experimental Example 1-2 of the present application.

Referring to FIG. 10, an XRD measurement was performed for a positive electrode active material according to Experimental Example 1-2. Specifically, an XRD measurement was performed for the positive electrode active material in an initial state before charging and discharging, and an XRD measurement was performed for the positive electrode active material after 500 times of charging and discharging of the lithium secondary battery of Experimental Example 1-2 under 1C condition.

As can be understood from FIG. 10, it can be confirmed that an initial crystal structure of the positive electrode active material of Experimental Example 1-2 is maintained to be substantially the same even after 500 times of charging and discharging. In addition, it can be confirmed that an intensity of peak values is rather increased as a whole. In other words, it can be seen that a crystallinity of the positive electrode active material is rather increased after charging and discharging. As such, it can be interpreted that an increase in crystallinity after charging and discharging is an unique crystallographic/material property due to a combination between the solid electrolyte according to the embodiment of the present application including a compound, in which a cation and an anion are bound according to the embodiment of the present application, and $LiFePO_4$ positive electrode active material.

Figure 11:
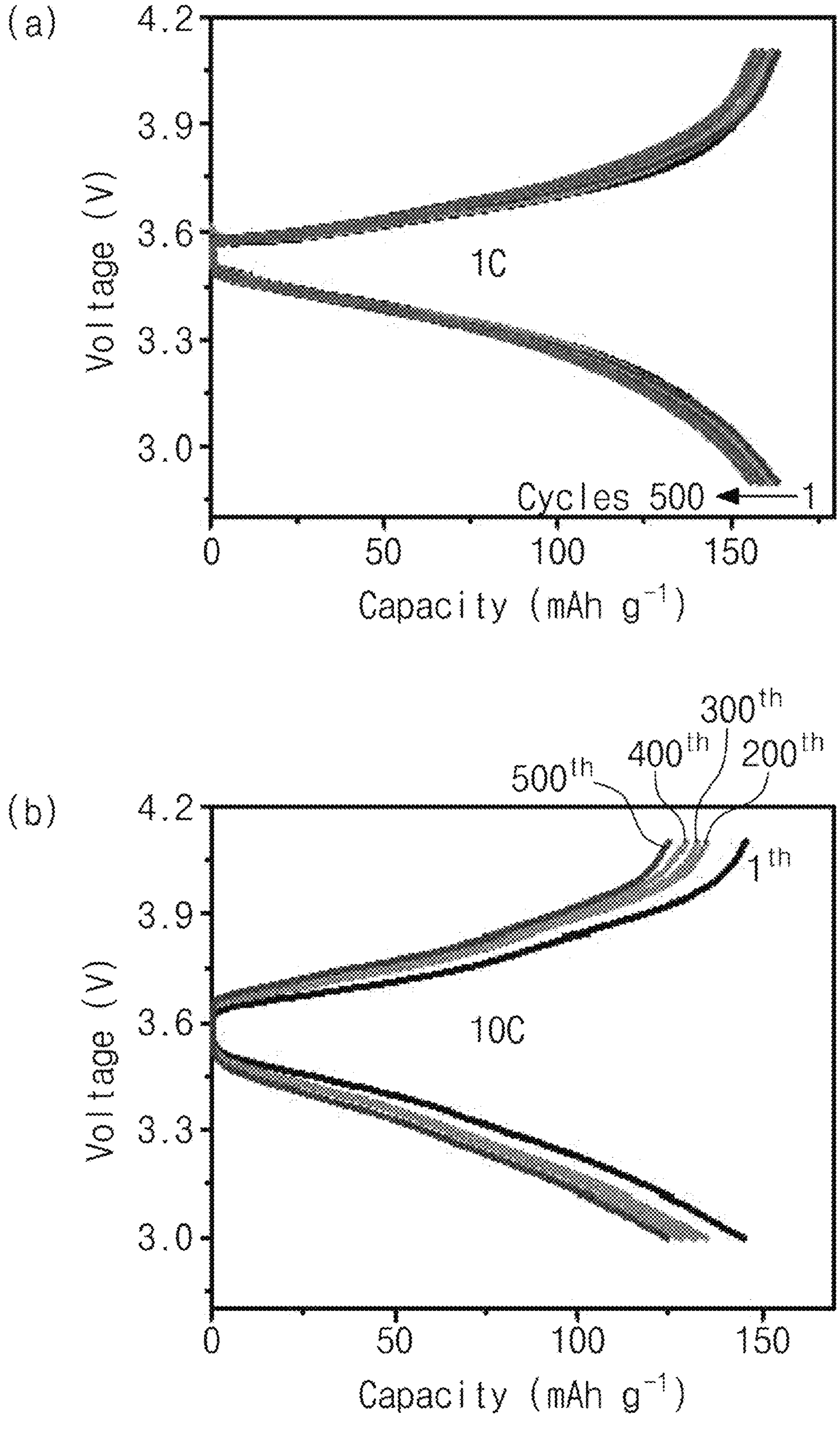
FIG. 11 is a graph for explaining charge/discharge properties of a lithium second battery according to Experimental Example 1-2 of the present application.
Figure 12:
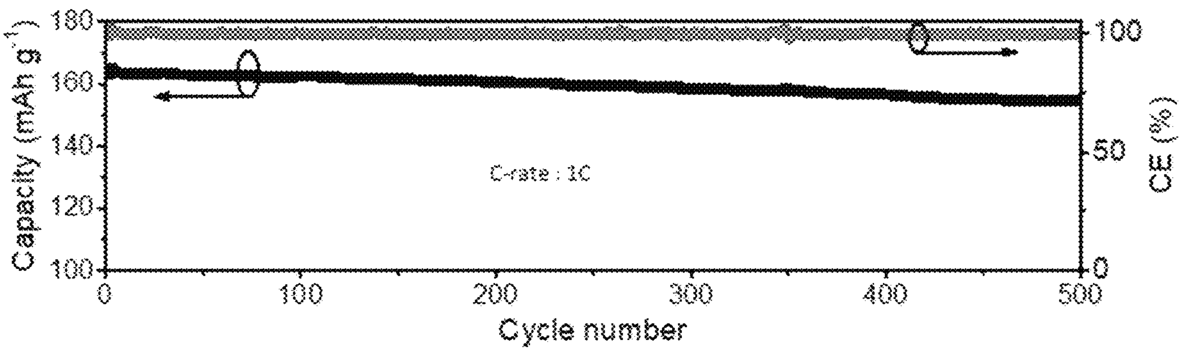
FIG. 12 is a graph for explaining life properties of a lithium second battery according to Experimental Example 1-2 of the present application.

FIG. 11 is a graph for explaining charge/discharge properties of a lithium second battery according to Experimental Example 1-2 of the present application, and FIG. 12 is a graph for explaining life properties of a lithium second battery according to Experimental Example 1-2 of the present application.

Referring to FIGS. 11 and 12, charge/discharge was performed 500 times for a lithium secondary battery according to Experimental Example 1-2 under 1C and 10C conditions.

In case of using the $LiFePO_4$ positive electrode active material of Experimental Example 1-2, it can be confirmed that the battery has a high capacity of 163 $mAhg^{-1}$ and 145.5 $mAhg^{-1}$, respectively, under 1C and 10C conditions, and has a high retention property of 96% and 87% or more even after 500 times of charging/discharging.

In particular, as can be understood from FIG. 12, in case of charging and discharging under 1C condition, it can be confirmed that coulombic efficiency maintains a high value of 99.8% or more even after 500 times of charging and discharging.

In other words, it can be seen that the solid electrolyte including a cation and an anion prepared according to the embodiment of the present application is combined with the $LiFePO_4$ positive electrode active material to realize high charge/discharge properties and long life properties.

Figure 13:
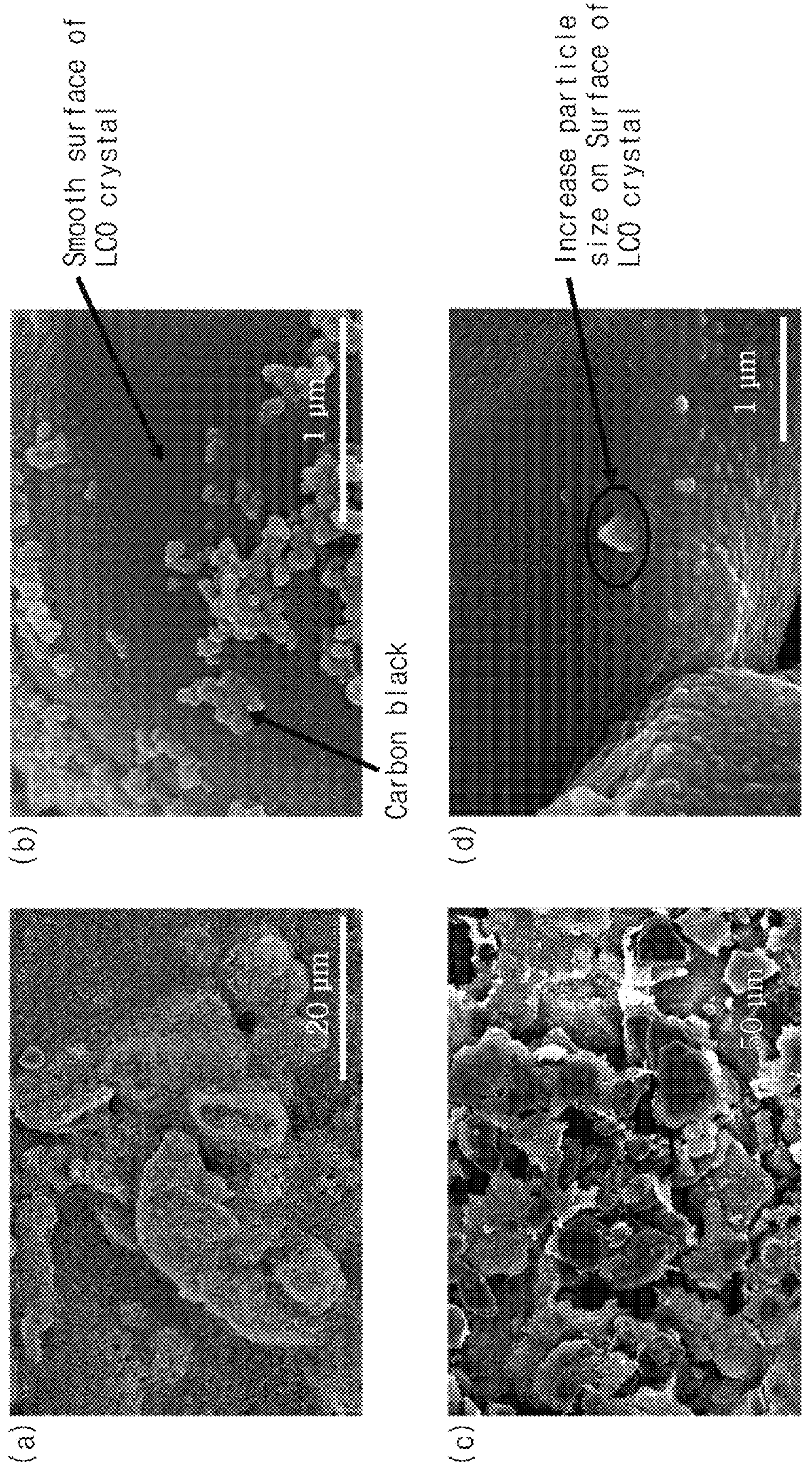
FIG. 13 is a view showing SEM pictures of a positive electrode active material according to Experimental Example 1-3 of the present application.

FIG. 13 is a view showing SEM pictures of a positive electrode active material according to Experimental Example 1-3 of the present application.

Referring to FIG. 13, SEM pictures were taken of a positive electrode active material according to Experimental Example 1-3. (a) and (b) of FIG. 13 are view showing SEM pictures of a positive electrode active material in an initial state before charging and discharging, and (c) and (d) of FIG. 13 are views showing SEM pictures of a positive electrode active material after 500 times of charging and discharging of the lithium secondary battery of Experimental Example 1-3 under 1C condition.

As can be understood from FIG. 13, in case of the lithium secondary battery of Experimental Example 1-3 including a $LiCoO_2$ positive electrode active material having a rhombohedral crystal structure, it was observed that secondary protrusions are grown again along a specific direction on a surface of the positive electrode active material after 500 times of charging and discharging, and it can be seen that a crack occurs to the surface of the positive electrode active material after 500 times of charging and discharging.

Figure 14:
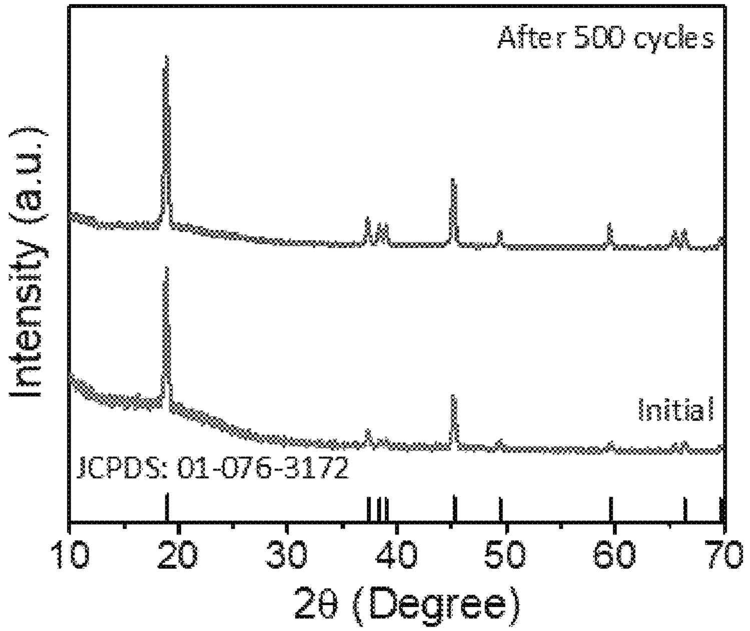
FIG. 14 is a view showing results of XRD measurement of a positive electrode active material according to Experimental Example 1-3 of the present application.

FIG. 14 is a view showing results of XRD measurement of a positive electrode active material according to Experimental Example 1-3 of the present application.

Referring to FIG. 14, an XRD measurement was performed for a positive electrode active material according to Experimental Example 1-3. Specifically, an XRD measurement was performed for the positive electrode active material in an initial state before charging and discharging, and an XRD measurement was performed for the positive electrode active material after 500 times of charging and discharging of the lithium secondary battery of Experimental Example 1-3 under 1C condition.

As can be understood from FIG. 14, it can be confirmed that an initial crystal structure of the positive electrode active material of Experimental Example 1-3 is maintained to be substantially the same even after 500 times of charging and discharging.

Figure 15:
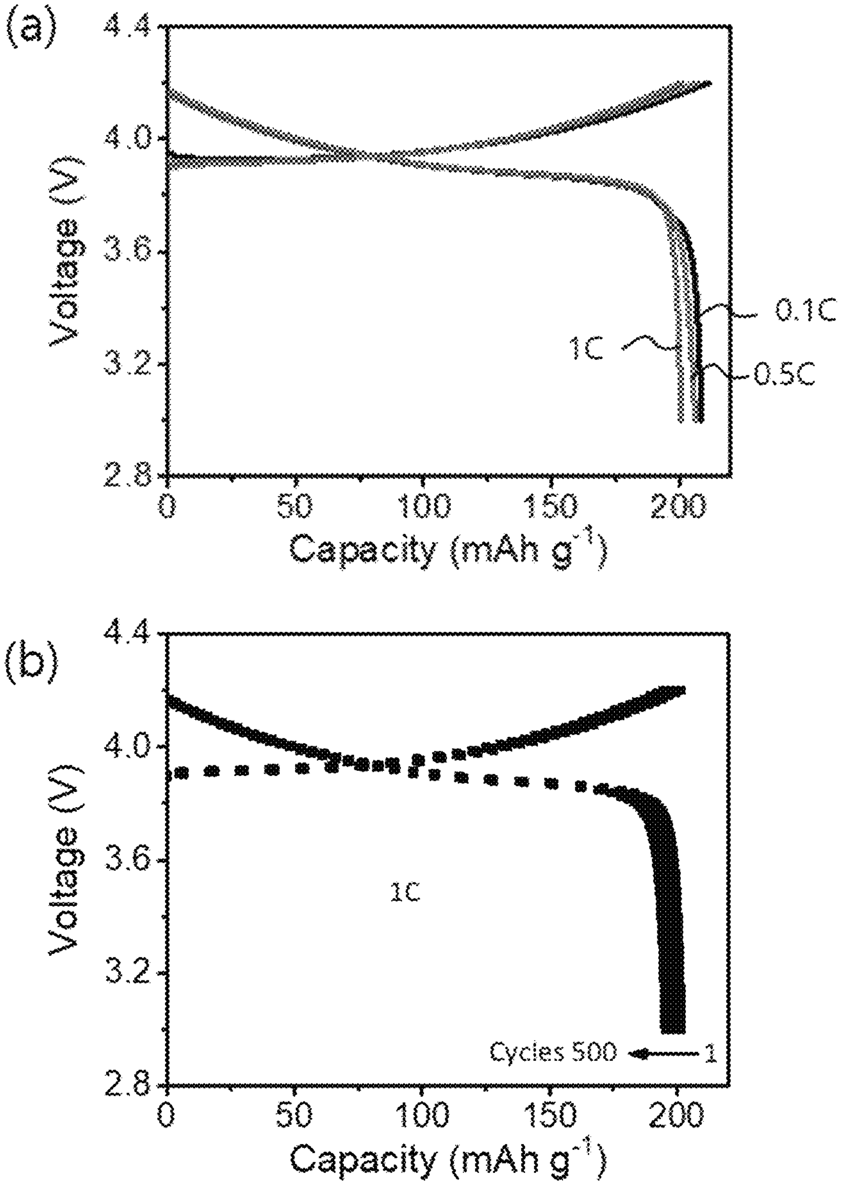
FIG. 15 is a graph for explaining charge/discharge properties of a lithium second battery according to Experimental Example 1-3 of the present application.
Figure 16:
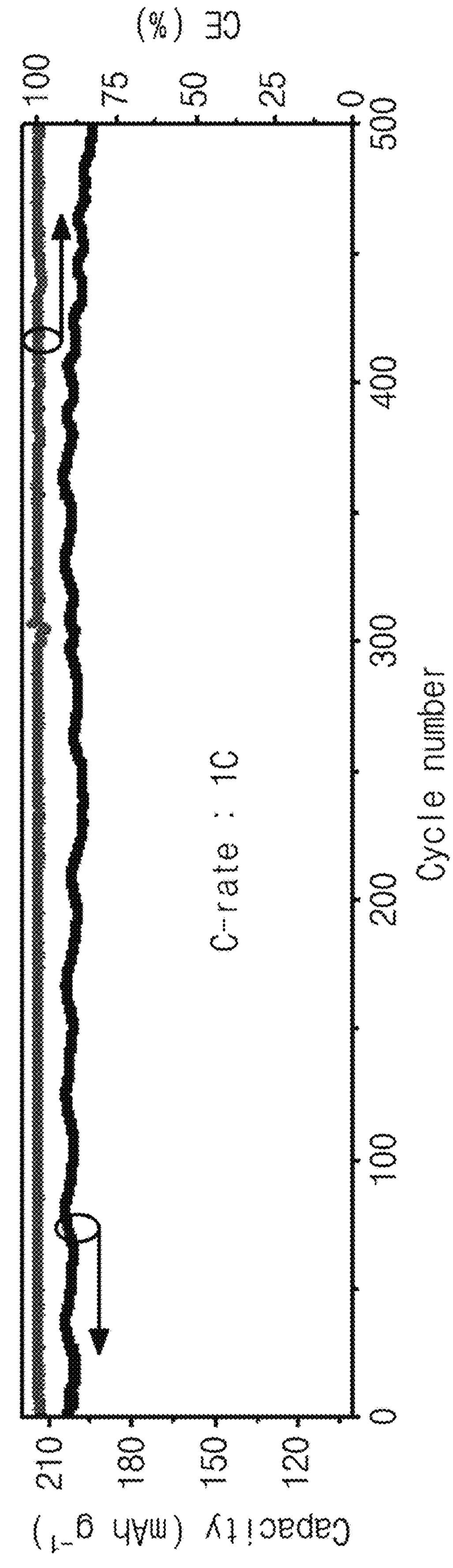
FIG. 16 is a graph for explaining life properties of a lithium second battery according to Experimental Example 1-3 of the present application.

FIG. 15 is a graph for explaining charge/discharge properties of a lithium second battery according to Experimental Example 1-3 of the present application, and FIG. 16 is a graph for explaining life properties of a lithium second battery according to Experimental Example 1-3 of the present application.

Referring to FIGS. 15 and 16, charge/discharge was performed 500 times for a lithium secondary battery according to Experimental Example 1-3 under 0.1C, 0.5C and 1C conditions.

In case of using the $LiCoO_2$ positive electrode active material of Experimental Example 1-3, it can be confirmed that the battery has a capacity of 209 mAhg-1 and 201 mAhg-1, respectively, under 0.1C and 1C conditions. In case of charging and discharging under 1C condition, it can be seen that the battery has a coulombic efficiency of 99.7% and maintains a capacity of 96% compared to an initial capacity even after 500 times of charging/discharging.

In other words, it can be seen that the solid electrolyte including a cation and an anion prepared according to the embodiment of the present application is combined with the $LiCoO_2$ positive electrode active material to realize high charge/discharge properties and long lifespan properties.

Figure 17:
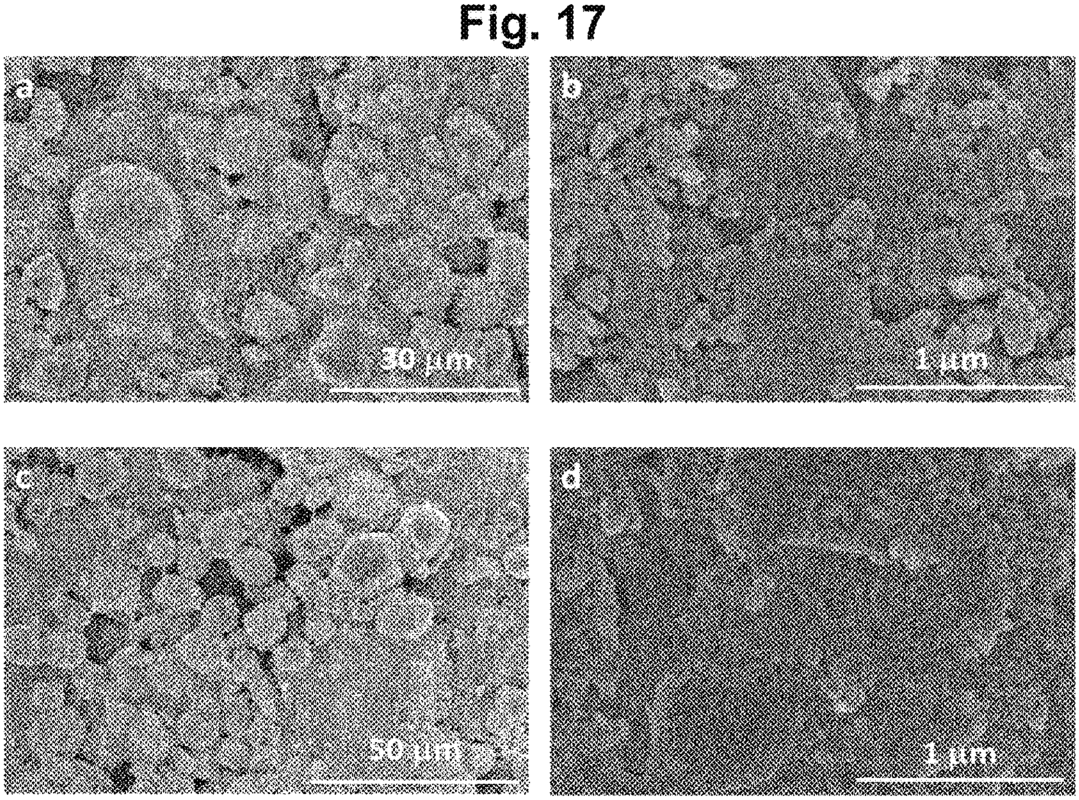
FIG. 17 is a view showing SEM pictures of a positive electrode active material according to Experimental Example 1-4 of the present application.

FIG. 17 is a view showing SEM pictures of a positive electrode active material according to Experimental Example 1-4 of the present application.

Referring to FIG. 17, SEM pictures were taken of a positive electrode active material according to Experimental Example 1-4. (a) and (b) of FIG. 17 are view showing SEM pictures of a positive electrode active material in an initial state before charging and discharging, and (c) and (d) of FIG. 17 are views showing SEM pictures of a positive electrode active material after 500 times of charging and discharging of the lithium secondary battery of Experimental Example 1-4 under 1C condition.

As can be understood from FIG. 17, it can be confirmed that a crack occurs to a surface of a $LiNi_{0.6}Co_{0.2}Mn_{0.2}O_2$ positive electrode active material having a rhombohedral crystal structure and the surface becomes smooth. In other words, it can be confirmed that a crystal of the $LiNi_{0.6}Co_{0.2}Mn_{0.2}O_2$ positive electrode active material having a layered structure with low stability collapses during charging and discharging.

In conclusion, it can be seen that the $LiNi_{0.6}CO_{0.2}Mn_{0.2}O_2$ positive electrode active material of Experimental Example 1-4 has relatively low crystallographic stability compared to the $LiFePO_4$ positive electrode active material of Experimental Example 1-1.

Figure 18:
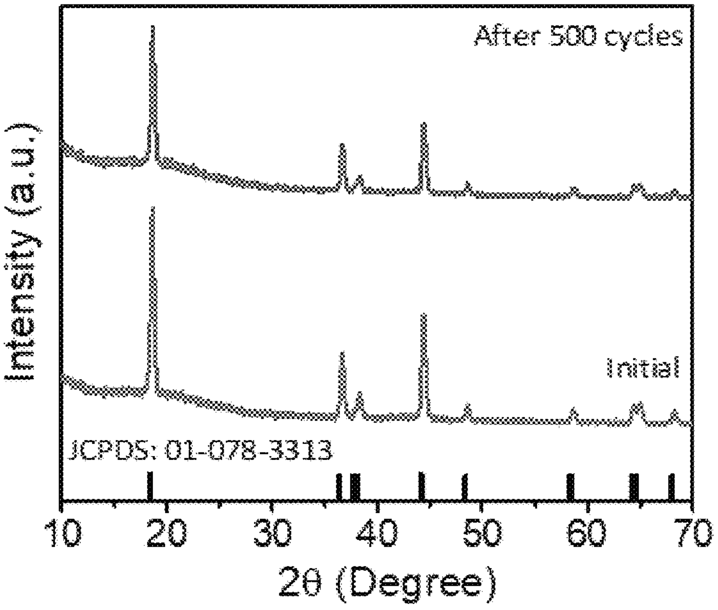
FIG. 18 is a view showing results of XRD measurement of a positive electrode active material according to Experimental Example 1-4 of the present application.

FIG. 18 is a view showing results of XRD measurement of a positive electrode active material according to Experimental Example 1-4 of the present application.

Referring to FIG. 18, an XRD measurement was performed for a positive electrode active material according to Experimental Example 1-4. Specifically, an XRD measurement was performed for the positive electrode active material in an initial state before charging and discharging, and an XRD measurement was performed for the positive electrode active material after 500 times of charging and discharging of the lithium secondary battery of Experimental Example 1-4 under 1C condition.

As can be understood from FIG. 18, it can be confirmed that an initial crystal structure of the positive electrode active material of Experimental Example 1-4 is maintained to be substantially the same even after 500 times of charging and discharging. However, in case of the positive electrode active material of Experimental Examples 1-4, it can be seen that an overall peak value is decreased and crystallinity is decreased due to the charging and discharging.

Figure 19:
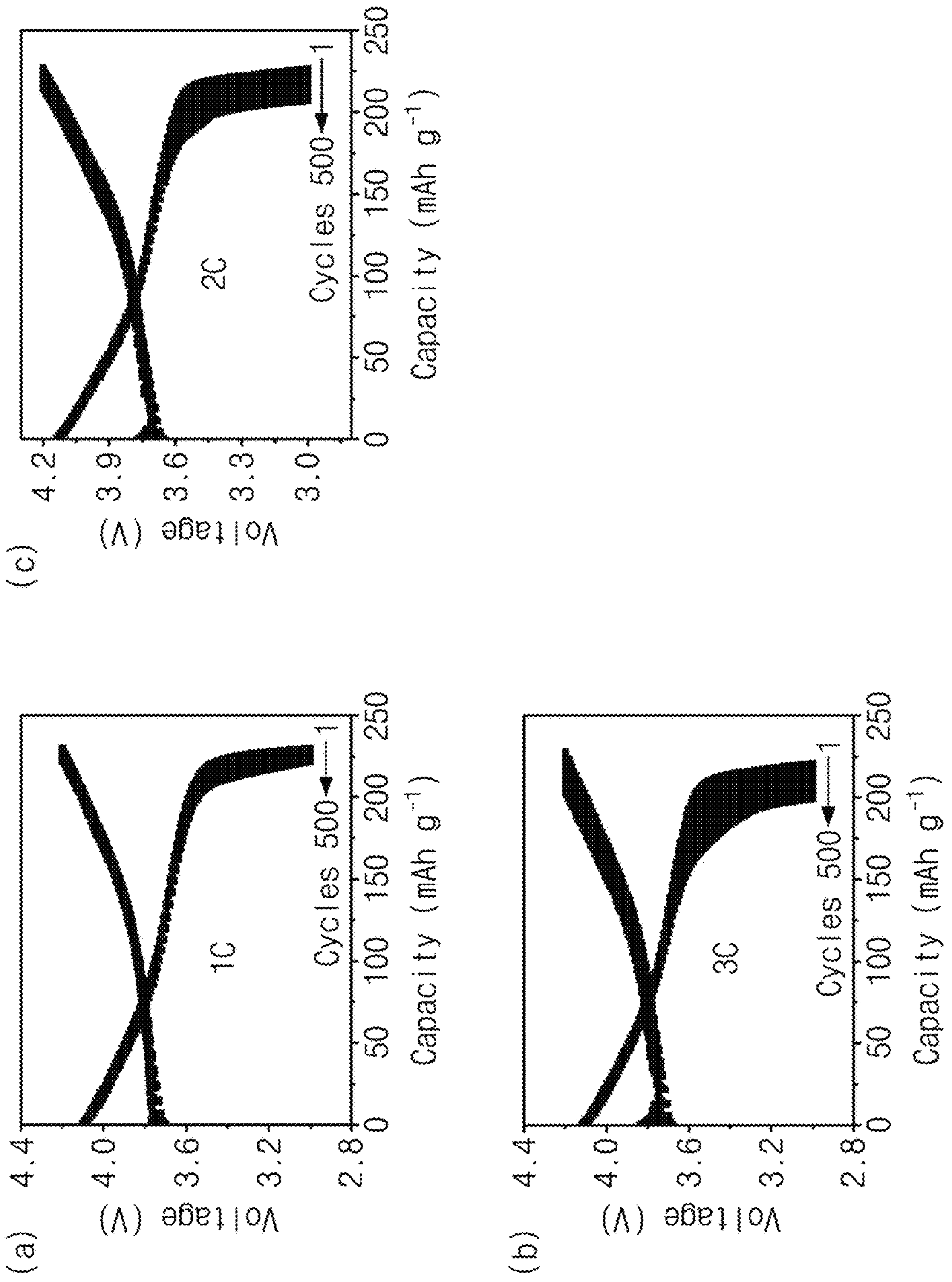
FIG. 19 is a graph for explaining charge/discharge properties of a lithium second battery according to Experimental Example 1-4 of the present application.
Figure 20:
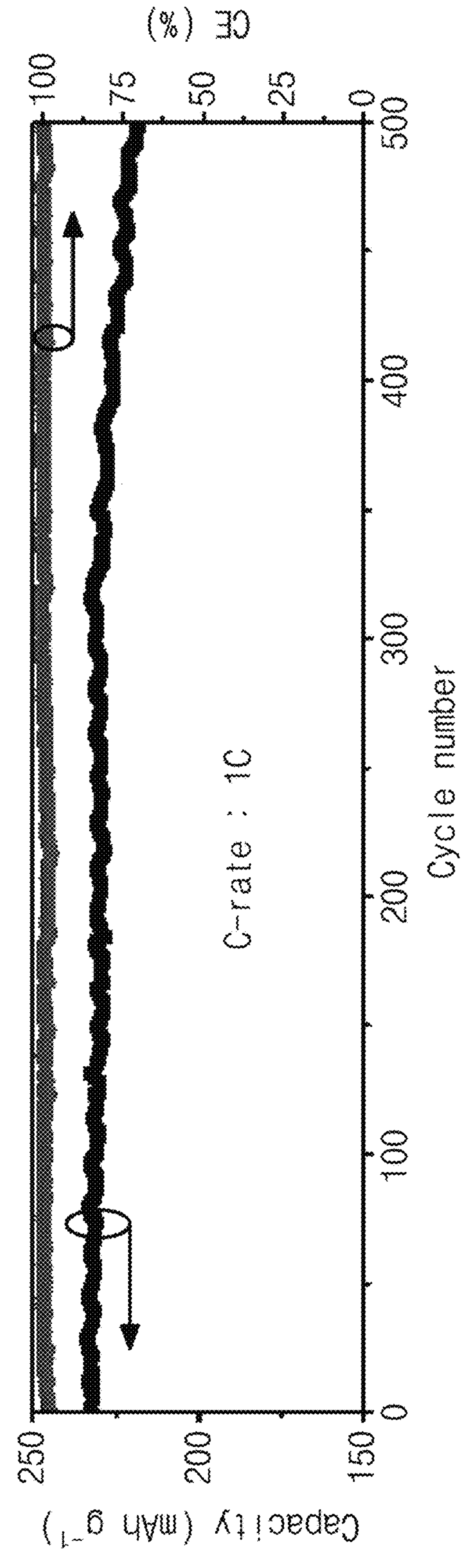
FIG. 20 is a graph for explaining life properties of a lithium second battery according to Experimental Example 1-4 of the present application.

FIG. 19 is a graph for explaining charge/discharge properties of a lithium second battery according to Experimental Example 1-4 of the present application, and FIG. 20 is a graph for explaining life properties of a lithium second battery according to Experimental Example 1-4 of the present application.

Referring to FIGS. 19 and 20, charge/discharge was performed 500 times for a lithium secondary battery according to Experimental Example 1-4 under 1C, 2C and 3C conditions.

In case of using the $LiNi_{0.6}Co_{0.2}Mn_{0.2}O_2$ positive electrode active material of Experimental Example 1-4, it can be confirmed that the battery has a high capacity of 231 $mAhg^{-1}$ under 1C condition, and it can be seen that the battery has a high retention property of 99.8% or more even after 500 times of charging/discharging. In addition, it can be seen that the battery has a high retention property of 90% and 88%, respectively, even after 500 times of charging and discharging even under 2C and 3C conditions.

In case of not using the solid electrolyte as in an embodiment of the present application, considering that a secondary battery using a $LiNi_{0.6}CO_{0.1}Mn_{0.1}O_2$ positive electrode active material generally exhibits a capacity of about 210 mAh/g-1 and a secondary battery using a $LiNi_{0.8}Co_{0.1}Mn_{0.1}O_2$ positive electrode active material has a capacity of about 230 mAhg-1, it can be seen that the solid electrolyte including a cation and an anion prepared according to an embodiment of the present application is combined with a positive electrode active material containing nickel, cobalt, and manganese to realize high charge and discharge properties. In other words, incase of using the solid electrolyte as in an embodiment of the present application, it can be confirmed that it is possible to implement charge/discharge properties substantially similar to those of using a positive electrode active material having a relatively high nickel concentration, even when using a positive electrode active material having a relatively low nickel concentration.

Figure 21:
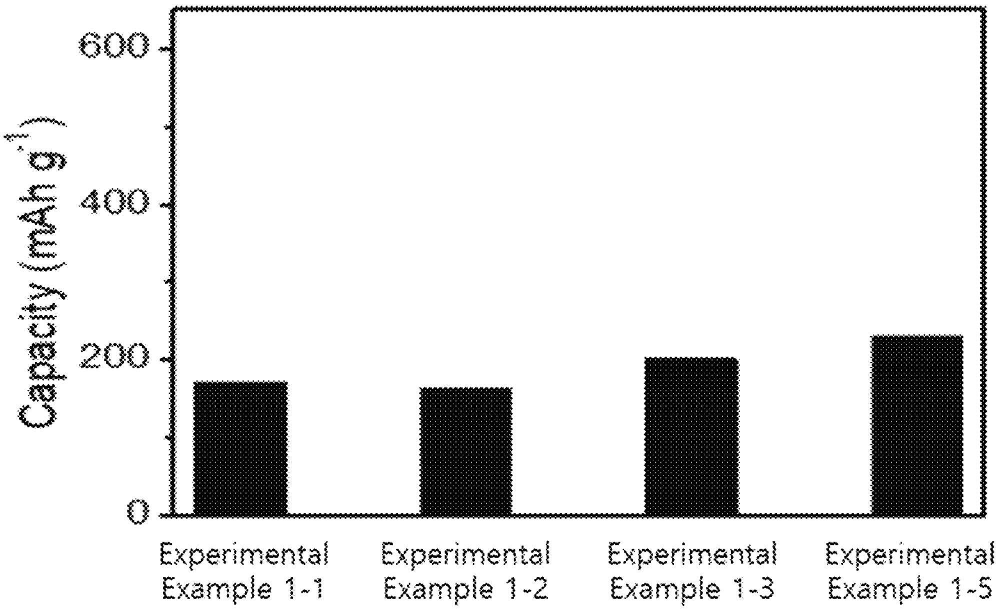
FIG. 21 is a view for comparing charge/discharge properties of a lithium second battery according to Experimental Examples 1-1 to 1-4 of the present application.

FIG. 21 is a view for comparing charge/discharge properties of a lithium second battery according to Experimental Examples 1-1 to 1-4 of the present application.

Referring to FIG. 21, a comparison was made fora capacity among the lithium secondary batteries according to Experimental Examples 1-1 to 1-4.

In case of including the $LiFePO_4$ positive electrode active material prepared according to Experimental Example 1-1, it can be confirmed that the battery has a capacity higher than that of including the $LiFePO_4$ positive electrode active material according to Experimental Example 1-2 sold in the market.

In addition, it can be confirmed that a solid electrolyte having a compound in which an cation and an anion are bound may be used with a positive electrode active material at various compositions such as $LiFePO_4$, $LiCoO_2$, $LiNi_{0.6}Co_{0.2}Mn_{0.2}O_2$.

Hereinafter, a functional positive electrode active material prepared according to a specific experimental example of the present application, and results of evaluating properties will be described accordingly.

Preparing of Functional Positive Electrode Active Material according to Experimental Example 1-5

A positive electrode active material according to Experimental Example 1-1 was used as a base positive electrode active material and dispersed in the NMP to prepare a first stock solution.

After graphite powder was treated with $H_2SO_4$ at a high concentration, and $KMnO_4$ was added at 0° C. After that, the mixture was reacted at 35° C. for 30 minutes and reacted at 98° C. for 15 minutes. The reaction was terminated by adding 30% $H_2O_2$ and 500 ml of deionized water, filtered, and washed with HCl (1:10) to remove unreacted metal ions and acids. After that, the obtained product was washed with deionized water and dried to synthesize graphene powder.

Then, the graphene powder was dispersed in the NMP to prepare a second stock solution in which the graphene powder was dispersed.

The second stock solution, in which the graphene powder was dispersed, was added dropwise to the first stock solution having the base positive electrode active material and reacted at 200° C. for one hour, so as to prepare a functional positive electrode active material according to Experimental Examples 1-5, in which the graphene powder was doped into the $LiFePO_4$-based positive electrode active material while adjusting a ratio of the graphene powder at 1 at %, 2 at %, 3 at %, 5 at %, and 10 at %.

Preparing of Functional Positive Electrode Active Material according to Experimental Example 1-6

Graphite was used as a working electrode, and deionized water, in which $H_2SO_4$ was dissolved, was used as an electrolytic solution to peel off the graphite at 10. 5V for eight minutes, thereby preparing graphene powder.

Then, the graphene powder was dispersed in the NMP to prepare a second stock solution in which the graphene powder was dispersed.

After that, the second stock solution, in which the graphene powder was dispersed, was added dropwise to the first stock solution having the base positive electrode active material prepared according to Experimental Example 1-5 and reacted at 200° C. for one hour, so as to prepare a functional positive electrode active material according to Experimental Examples 1-6, in which the graphene powder of 2 at % was doped into the $LiFePO_4$-based positive electrode active material.

Preparing of Functional Positive Electrode Active Material according to Experimental Example 1-7

A base positive electrode active material was prepared by the same method as in Experimental Example 1-5, except for doubling a concentration of a chelating agent compared with the method for preparing the base positive electrode active material as described in Experimental Examples 1-5 in order to use the chelating agent as a carbon source. After that, a first source, in which a lithium precursor was mixed, was added dropwise and heat-treated at 600° C. for two hours in a nitrogen atmosphere, so as to prepare a functional positive electrode active material, in which graphitic carbon was coated on a surface of the $LiFePO_4$-based positive electrode active material according to Experimental Examples 1-7.

Preparing of Functional Positive Electrode Active Material according to Experimental Example 1-8

Graphene powder was synthesized by the same method as in Experimental Examples 1-5. A graphene source was prepared by mixing the graphene powder with the base solvent of Experimental Examples 1-5.

A second source, in which an iron precursor was mixed, was mixed in a third source, in which a phosphorus precursor was mixed, by the same method as in Experimental Example 1-5, except for mixing with a graphene source, and then heat-treated at 60° C. for two hours to produce an intermediate product, which was then washed with ethanol and deionized water, and dried at 60° C. for three hours in a vacuum condition.

After that, a functional positive electrode active material, in which graphene was grown on a surface of the $LiFePO_4$-based positive electrode active material according to Experimental Examples 1-8, was prepared by performing the same method as the method for preparing the base positive electrode active material of Experimental Example 1-5.

Preparing of Functional Positive Electrode Active Material according to Experimental Example 1-9

A functional positive electrode active material according to Experimental Examples 1-9, in which the graphene powder of 2 at % was doped into the $LiFePO_4$-based positive electrode active material, was prepared by performing the same method as in Experimental Example 1-5, except for using ethylene glycol and deionized water with the NMP omitted as a base solvent.

Preparing of Functional Positive Electrode Active Material according to Experimental Example 1-10

A functional positive electrode active material according to Experimental Examples 1-10, in which the graphene powder of 2 at % was doped into the $LiFePO_4$-based positive electrode active material, was prepared by performing the same method as in Experimental Example 1-5, except for using ethylene glycol with the NMP and deionized water omitted as a base solvent.

Preparing of Functional Positive Electrode Active Material according to Experimental Example 1-11

A functional positive electrode active material according to Experimental Example 1-11, in which the graphene powder of 2 at % was doped into the $LiFePO_4$-based positive electrode active material, was prepared by performing the same method as in Experimental Example 1-5, except for using deionized water with the NMP and ethylene glycol omitted as a base solvent.

Preparing of Functional Positive Electrode Active Material according to Experimental Example 1-12

A functional positive electrode active material according to Experimental Example 1-12, having graphene of 2 at %, was prepared simply by physically mixing the base positive electrode active material prepared according to Experimental Example 1-5 and the graphene according to Experimental Example 1-5.

Preparing of Functional Positive Electrode Active Material according to Experimental Example 1-13

A functional positive electrode active material according to Experimental Example 1-13, having graphene of 2 at %, was prepared by providing $LiFePO_4$ purchased from Sigma Aldrich as a base positive electrode active material and simply by physically mixing with graphene according to Experimental Example 1-5.

Preparing of Functional Positive Electrode Active Material according to Experimental Example 1-14

A functional positive electrode active material according to Experimental Example 1-14, in which the graphene powder of 2 at % was doped into the $LiFePO_4$-based positive electrode active material, was prepared by performing the same method as in Experimental Example 1-5, except for using $LiFePO_4$ purchased from Sigma Aldrich as a base positive electrode active material.

The functional positive electrode active material according to Experimental Examples 1-5 to 1-14 are summarized as shown in <Table 1> below.

TABLE 1

| Classification | $LiFePO_4$-based positive electrode active material | Graphene concentration | Functionalization |
|---|---|---|---|
| Experimental Example 1-5 | NMP, ethylene glycol, deionized water | 1 at %<br>2 at %<br>3 at %<br>5 at %<br>10 at % | Graphene synthesis and doping |
| Experimental Example 1-6 | NMP, ethylene glycol, deionized water | 2 at % | Graphene peeling and doping |
| Expeimental Example 1-7 | NMP, ethylene glycol, deionized water | 2 at % | Graphitic carbon coating |
| Experimental Example 1-8 | NMP, ethylene glycol, deionized water | 2 at % | Graphene growth |
| Experimental Example 1-9 | NMP omitted | 2 at % | Graphene synthesis and doping |
| Experimental Example 1-10 | NMP and deionized water omitted | 2 at % | Graphene synthesis and doping |

TABLE 1-continued

| Classification | $LiFePO_4$-based positive electrode active material | Graphene concentration | Functionalization |
|---|---|---|---|
| Experimental Example 1-11 | NMP and ethylene glycol omitted | 2 at % | Graphene synthesis and doping |
| Experimental Example 1-12 | NMP, ethylene glycol, deionized water | 2 at % | Physical mixing |
| Experimental Example 1-13 | Commercial $LiFePO_4$ | 2 at % | Physical mixing |
| Experimental Example 1-14 | Commercial $LiFePO_4$ | 2 at % | Graphene synthesis and doping |

Figure 22:
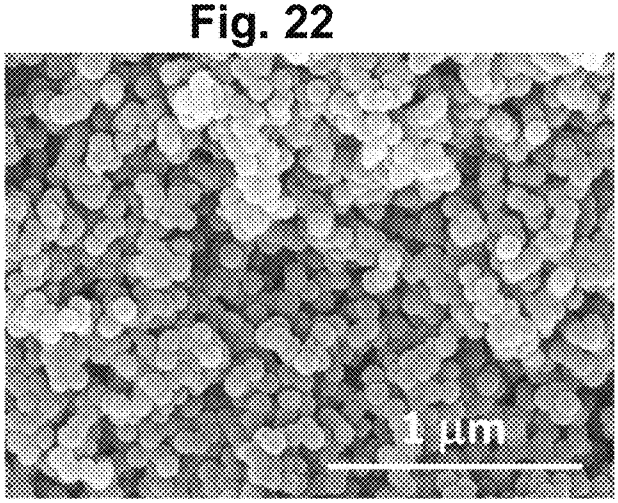
FIG. 22 is a view showing SEM pictures of a functional positive electrode active material according to Experimental Example 1-5 of the present application.
Figure 22:
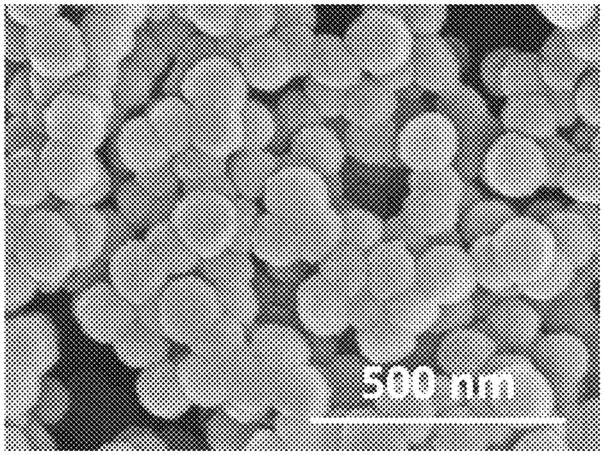
Figure 23:
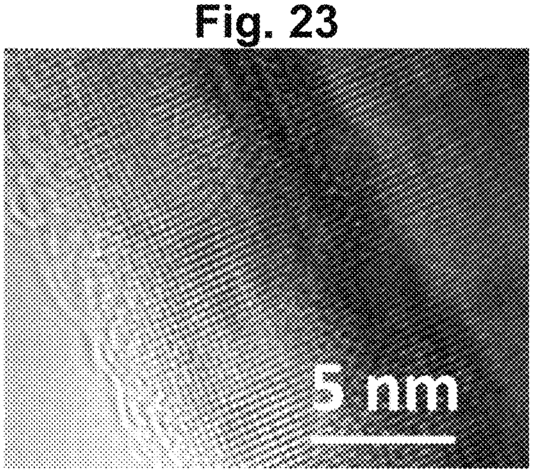
FIG. 23 is a view showing TEM pictures of a functional positive electrode active material according to Experimental Example 1-5 of the present application.
Figure 24:
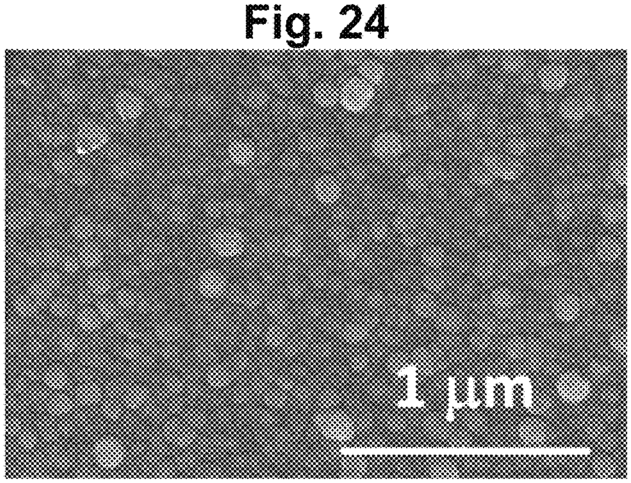
FIG. 24 is a view showing SEM pictures of a functional positive electrode active material according to Experimental Example 1-9 of the present application.
Figure 25:
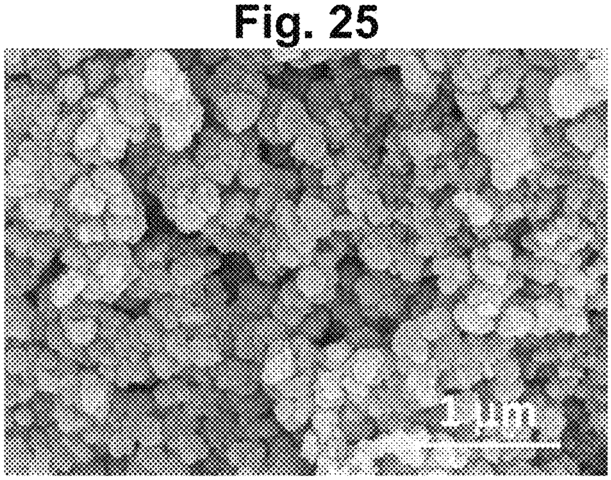
FIG. 25 is a view showing SEM pictures of a functional positive electrode active material according to Experimental Example 1-10 of the present application.
Figure 26:
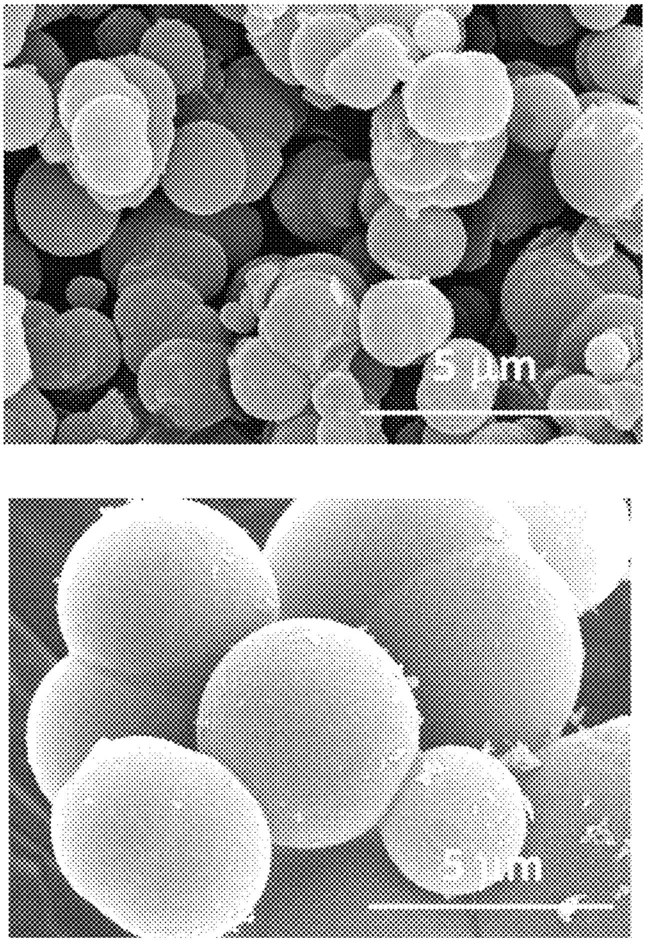
FIG. 26 is a view showing pictures of a functional positive electrode active material according to Experimental Example 1-11 of the present application.

FIG. 22 is a view showing SEM pictures of a functional positive electrode active material according to Experimental Example 1-5 of the present application, FIG. 23 is a view showing TEM pictures of a functional positive electrode active material according to Experimental Example 1-5 of the present application, FIG. 24 is a view showing SEM pictures of a functional positive electrode active material according to Experimental Example 1-9 of the present application, FIG. 25 is a view showing SEM pictures of a functional positive electrode active material according to Experimental Example 1-10 of the present application, and FIG. 26 is a view showing pictures of a functional positive electrode active material according to Experimental Example 1-11 of the present application.

Referring to FIGS. 22 to 26, SEM and TEM pictures were taken of the functional positive electrode active material (graphene of 2 at %) according to Experimental Example 1-5, and SEM pictures were taken of the functional positive electrode active materials according to Experimental Examples 1-9 to 1-11.

As shown in FIG. 26, incase of using the NMP and ethylene glycol according to Experimental Example 1-11 and using deionized water, it can be confirmed that particles of the base positive electrode active material are not uniform and a size of the base positive electrode active material is large in a unit of micrometer.

In contrast, as shown in FIGS. 22 to 25, in case of including at least any one of the NMP and ethylene glycol in a synthesis process of the base positive electrode active material, it can be confirmed that particles of a uniform size are prepared as a whole. In addition, as shown in FIG. 22, in case of including all of the NMP, ethylene glycol and deionized water in a synthesis process of the base positive electrode active material, it can be confirmed that small particles having a uniformly small size are prepared.

In other words, it can be seen that using a base solvent including the NMP, ethylene glycol and deionized water in a process of preparing the $LiFePO_4$-based positive electrode active material is an efficient method of preparing particles having a uniformly small size.

In addition, as shown in FIG. 23, it can be confirmed that a graphene layer is formed on a surface of the $LiFePO_4$-based positive electrode active material when graphene of 2 at % is doped. Specifically, it can be confirmed that graphene is formed at an edge site of the plane 311 of the $LiFePO_4$-based positive electrode active material.

Figure 27:
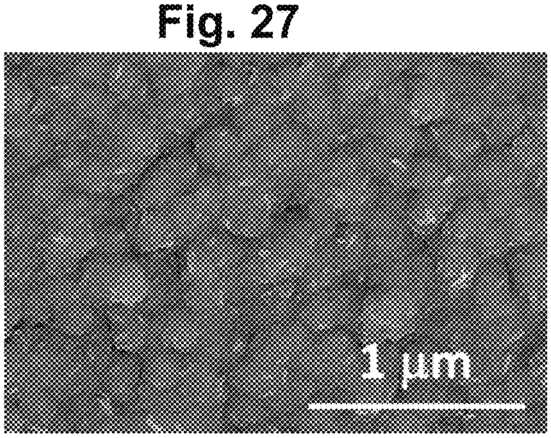
FIG. 27 is a view showing SEM pictures of a functional positive electrode active material according to Experimental Example 1-6 of the present application.
Figure 27:
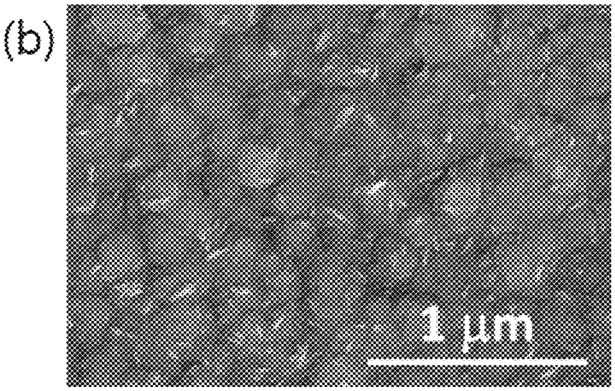
Figure 29:
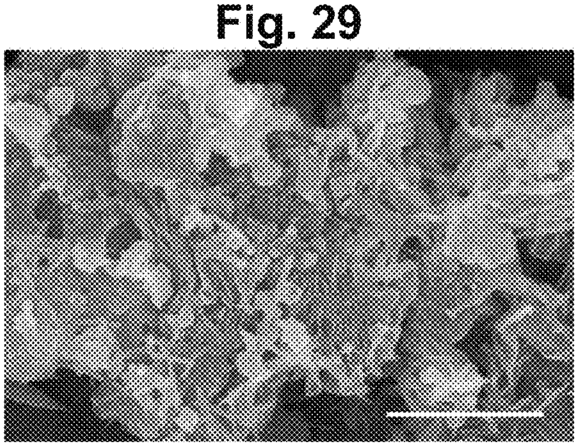
FIG. 29 is a view showing SEM pictures of a functional positive electrode active material according to Experimental Example 1-8 of the present application.

FIG. 27 is a view showing SEM pictures of a functional positive electrode active material according to Experimental Example 1-6 of the present application, FIG. 27 is a view showing SEM pictures of a functional positive electrode active material according to Experimental Example 1-7 of the present application, and FIG. 29 is a view showing SEM pictures of a functional positive electrode active material according to Experimental Example 1-8 of the present application.

Figure 28:
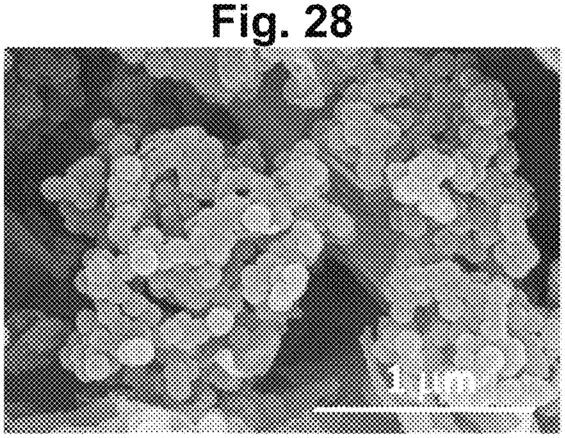
FIG. 28 is a view showing SEM pictures of a functional positive electrode active material according to Experimental Example 1-7 of the present application.

Referring to FIGS. 27 to 29, SEM pictures were taken of the functional electrode active materials according to Experimental Examples 1-6 to 1-8 of the present application.

As shown in FIG. 27, in case of the functional positive electrode active material prepared according to Experimental Example 1-6, it can be confirmed that graphene is not uniformly distributed, compared to the functional positive electrode active material prepared according to Experimental Example 1-5 described with reference to FIG. 22.

In addition, as shown in FIG. 28, when graphitic carbon is coated on the $LiFePO_4$-based positive electrode active material according to Experimental Example 1-7, it can be seen that graphitic carbon on a surface of the base positive electrode active material is synthesized as nanoparticles to make a bond between $LiFePO_4$-based positive electrode active materials.

In addition, as shown in FIG. 29, when graphene is grown on a surface of the $LiFePO_4$-based positive electrode active material according to Experimental Example 1-8, it can be confirmed that the $LiFePO_4$-based positive electrode active material is grown as a non-uniform morphology.

Figure 30:
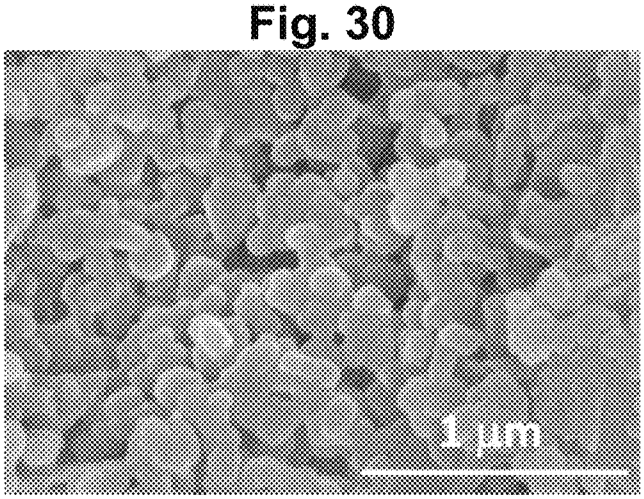
FIG. 30 is a view showing SEM pictures of a functional positive electrode active material according to Experimental Example 1-12 of the present application.

FIG. 30 is a view showing SEM pictures of a functional positive electrode active material according to Experimental Example 1-12 of the present invention, FIG. 22 is a view showing SEM pictures of a functional positive electrode active material according to Experimental Example 1-13 of the present invention, and FIG. 22 is a view showing SEM pictures of a functional positive electrode active material according to Experimental Example 1-14 of the present invention.

Figure 31:
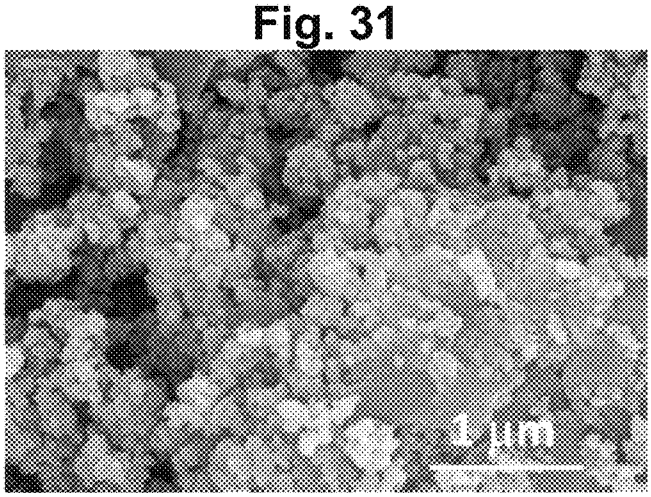
FIG. 31 is a view showing SEM pictures of a functional positive electrode active material according to Experimental Example 1-13 of the present application.
Figure 32:
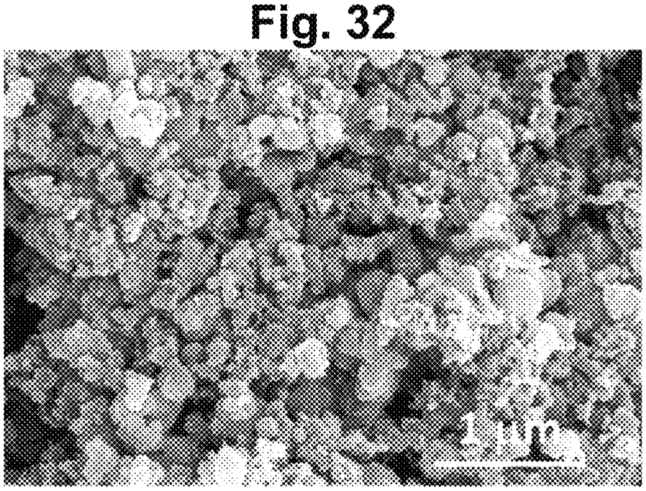
FIG. 32 is a view showing SEM pictures of a functional positive electrode active material according to Experimental Example 1-14 of the present application.

Referring to FIGS. 30 to 32, SEM pictures were taken of the functional electrode active materials according to Experimental Examples 1-12 to 1-14 of the present application.

As shown in FIG. 30, when preparing a functional positive electrode active material simply by mixing the $LiFePO_4$-based positive electrode active material according to Experimental Example 1-12 with graphene, it can be confirmed that the material is not relatively uniform and has an optional morphology compared to the functional positive electrode active material according to Experimental Example 1-5 as shown in FIG. 22.

As shown in FIG. 31, when using a commercial $LiFePO_4$-based positive electrode active material, it can be confirmed that the material has a relatively non-uniform morphology compared to not only Experimental Example 1-5, but also Experimental Example 1-12.

In addition, as shown in FIG. 32, when using a commercial $LiFePO_4$-based positive electrode active material, but doping with graphene according to an embodiment of the present application, it can be confirmed that the material has a relatively non-uniform morphology compared to not only Experimental Example 1-5, but also Experimental Example 1-12.

Figure 33:
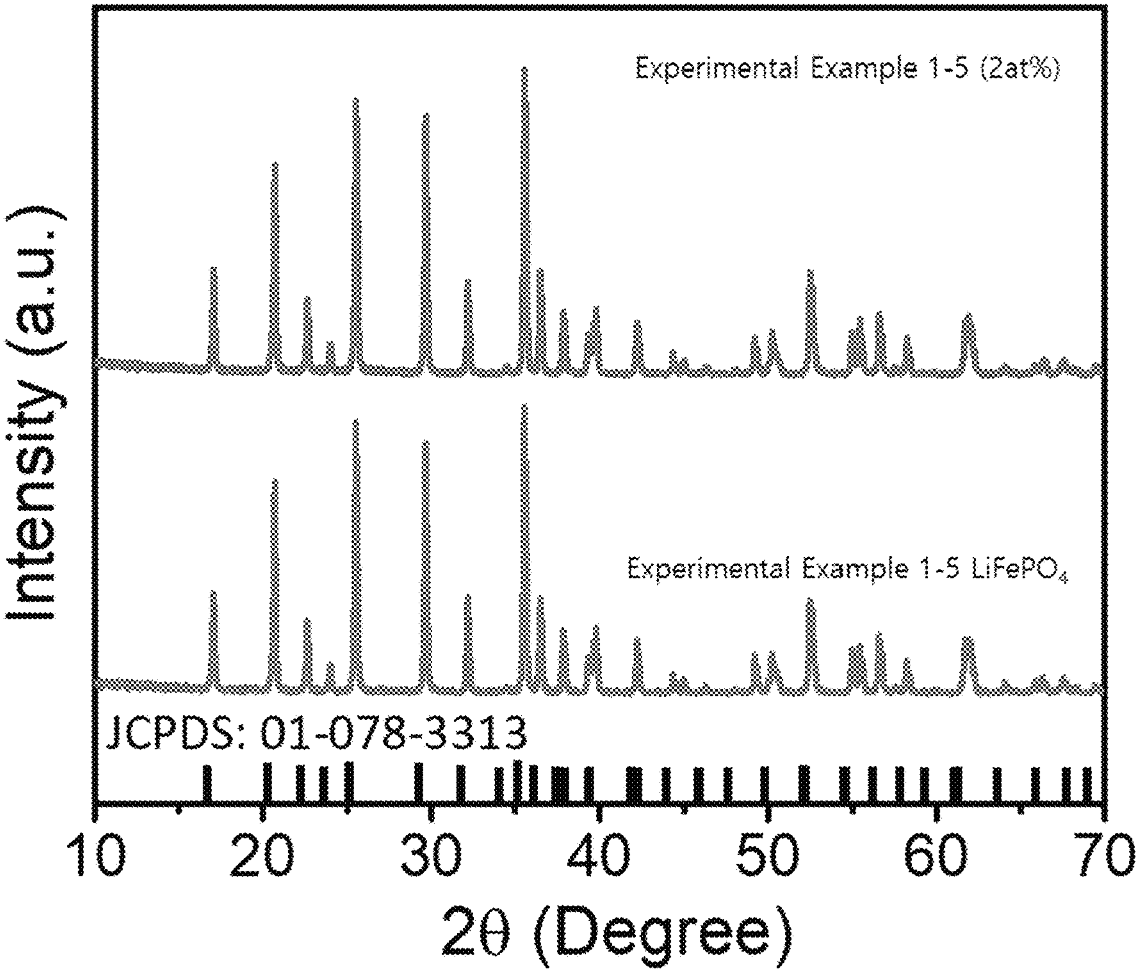
FIG. 33 is a view showing results of XRD analysis of a positive electrode active material according to Experimental Example 1-5 of the present application.
Figure 34:
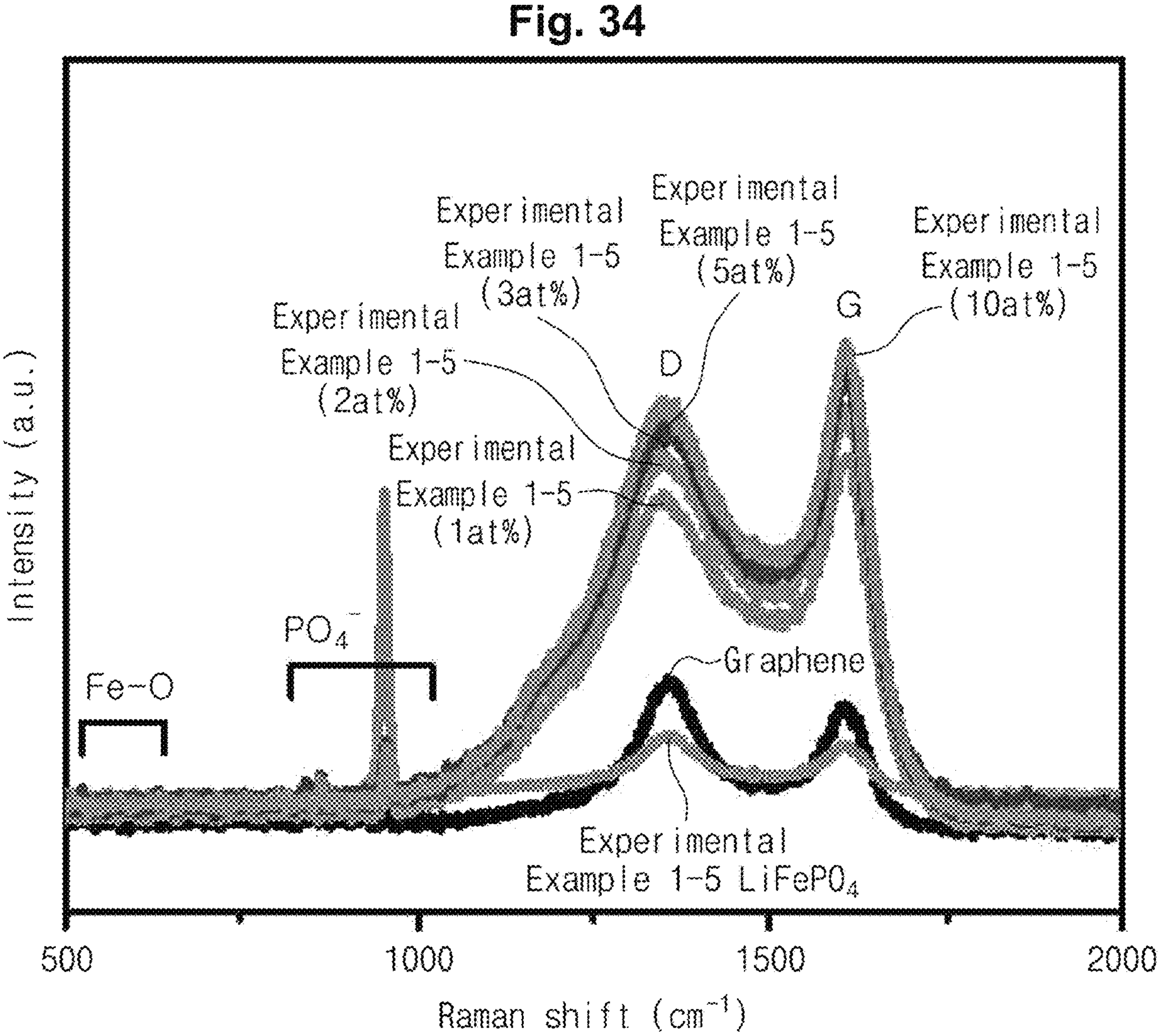
FIG. 34 is a view showing results of Raman spectrum of a functional positive electrode active material having graphene at various concentrations according to Experimental Example 1-5 of the present application.

FIG. 33 is a view showing results of XRD analysis of a positive electrode active material according to Experimental Example 1-5 of the present application, and FIG. 34 is a view showing results of Raman spectrum of a functional positive electrode active material having graphene at various concentrations according to Experimental Example 1-5 of the present invention.

Referring to FIGS. 33 and 34, an XRD analysis was made for the functional positive electrode active material having graphene of 2 at % according to Experimental Example 1-5, and a Raman spectrum was analyzed for functional positive electrode active materials having graphene powder of 1 at %, 2 at %, 3 at %, 5 at % and 10 at % according to Experimental Example 1-5.

As shown in FIG. 33, it can be confirmed that both the $LiFePO_4$-based positive electrode active material of Experimental Example 1-5 without the addition of graphene powder and the functional positive electrode active material having graphene powder of 2 at % according to Experimental Example 1-5 have an orthorhombic crystal structure and a Pnma space group, and it can be confirmed that the functional positive electrode active material of Experimental Examples 1-5 has high purity and high crystallinity and well maintains an initial crystal structure as it is even after the graphene powder is doped.

In addition, based on a result of XRD analysis, it was difficult to confirm a clear difference in a peak with or without the addition of graphene powder due to Bragg's reflection having high intensity 111 of the $LiFePO_4$-based positive electrode active material.

As shown in FIG. 34, as a result of Raman spectrum analysis of pure graphene, $LiFePO_4$-based positive electrode active material of Experimental Example 1-5, and the functional positive electrode active material having graphene powder of 1 at %, 2 at %, 3 at %, 5 at %, and 10 at % according to Experimental Example 1-5, a vibration of Fe—O and $PO_4^{3-}$ of the $LiFePO_4$-based positive electrode active material may be confirmed in the regions of 500-700 $cm^{-}$ and 800-1200 $cm^{-1}$, and the disorder/defect (D) band and graphitic (G) band of graphene were observed in 1259 $cm^{-1}$ and 1607 $cm^{-1}$ as a peak of high intensity.

It can be seen that a peak is slightly shifted in the D band of the functional positive electrode active material doped with graphene powder, and has a peak value at 1247 $cm^{-1}$.

The broadening of the peak of the D band of the functional positive electrode active material doped with graphene powder was the result of stacking a localized in-plane sp2 domain and a disordered graphitic crystal of graphene, and thus the charge/discharge capacity of the conductive and positive electrode active material may be increased.

In addition, a ratio ($I_D/I_G$) value of intensity of the D band to the intensity of the G band according to a concentration of graphene powder was measured as shown in <Table 2> below.

As will be described later, when a ratio of graphene powder in the functional positive electrode active material is more than 1 at % and less than 3 at %, a charge/discharge capacity may be the highest, and in this case, a ratio of intensity of the D band to the intensity of the G band ($I_D/I_G$) value may be greater than 3.2 and less than 3.26.

TABLE 2

| Ratio of graphene powder | $I_D/I_G$ ratio |
|---|---|
| 1 at % | 3.20 |
| 2 at % | 3.26 |
| 3 at % | 3.26 |
| 5 at % | 3.21 |
| 10 at % | 3.20 |

Figure 35:
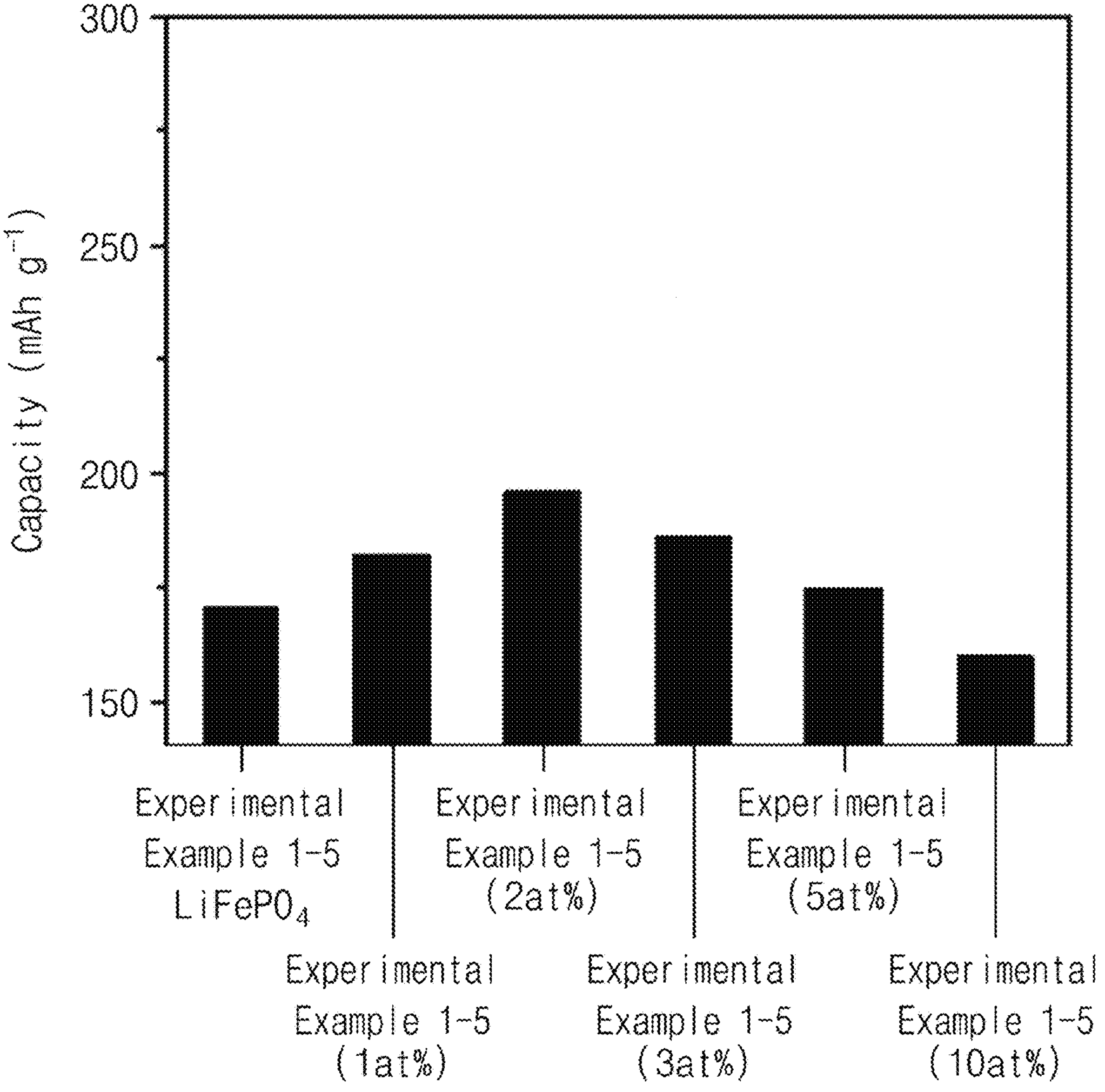
FIG. 35 is a graph showing a comparison between a base positive electrode active material according to Experimental Example 1-5 and a functional positive electrode active material according to Experimental Example 1-5 of the present application.
Figure 36:
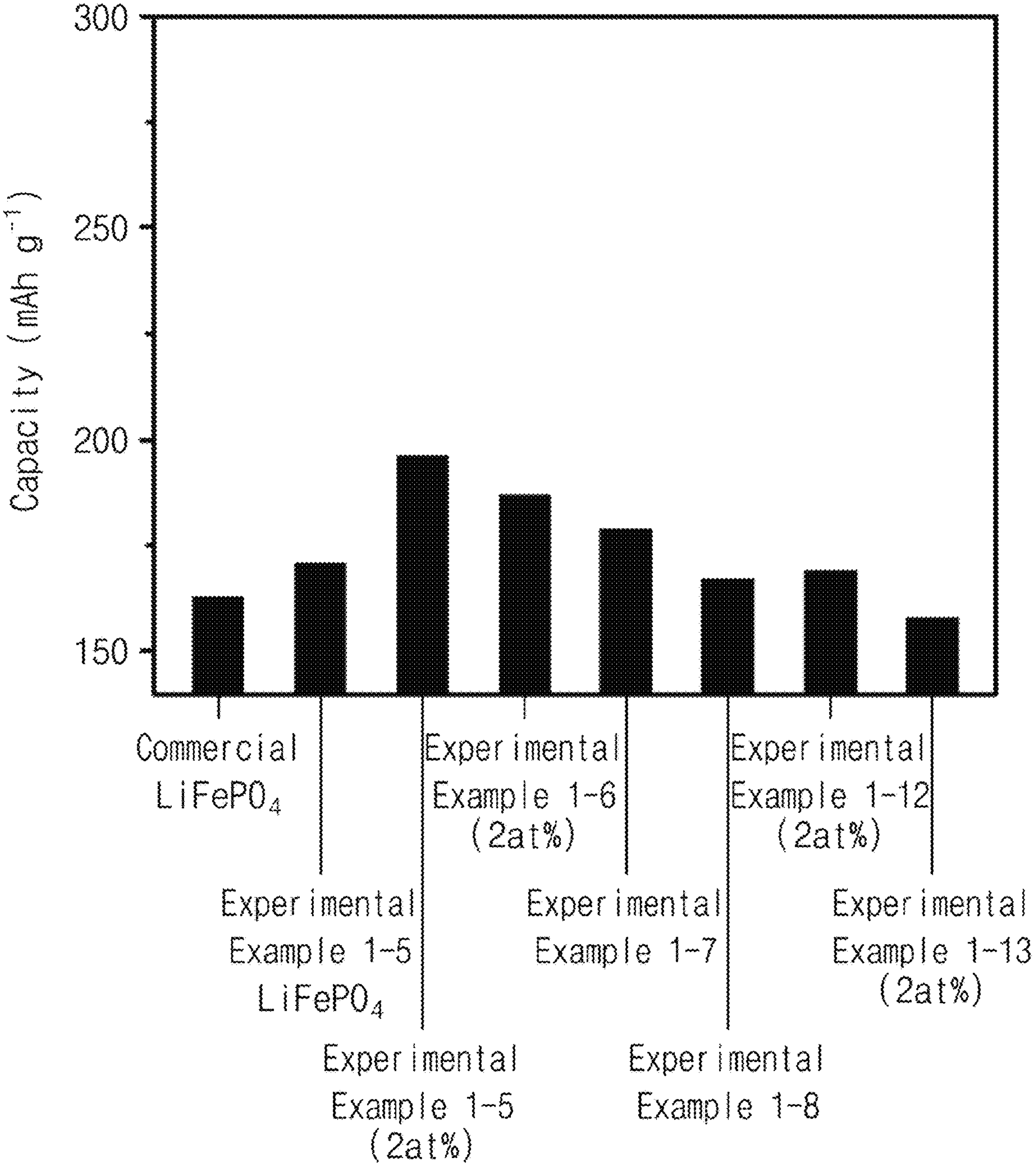
FIG. 36 is a graph showing a comparison of capacity among abase positive electrode active material according to Experimental Example 1-5, a functional positive electrode active material according to Experimental Example 1-5, functional positive electrode active materials according to Experimental Examples 1-6 to 1-9, 1-12, and 1-13 of the present application, and commercial $LiFePO_4$.

FIG. 35 is a graph showing a comparison between a base positive electrode active material according to Experimental Example 1-5 and a positive electrode active material according to Experimental Example 1-5 of the present application, and FIG. 36 is a graph showing a comparison of capacity among a base positive electrode active material according to Experimental Example 1-5, a functional positive electrode active material according to Experimental Example 1-5, functional positive electrode active materials according to Experimental Examples 1-6 to 1-9, 1-12, and 1-13 of the present application, and commercial LiFeFPO$_4$.

Referring to FIG. 35, a comparison was made for a capacity under 1C condition between the base positive electrode active material according to Experimental Example 1-5 and the functional positive electrode active material in which a ratio of graphene powder is 2 at %, 3 at %, 5 at %, and 10 at % according to Experimental Example 1-5.

In addition, referring to FIG. 36, a comparison was made for a capacity under 1C condition among the base positive electrode active material according to Experimental Example 1-5, the functional positive electrode active material having 2 at % of graphene powder according to Experimental Example 1-5, the functional positive electrode active materials according to Experimental Examples 1-6 to 1-9, 1-12, and 1-13, and commercial $LiFePO_4$.

As can be understood from FIG. 35, when the graphene powder is doped, it can be confirmed that the capacity is increased as compared to the $LiFePO_4$-based positive electrode active material of Experimental Examples 1-5. In particular, when a ratio of the graphene powder is more than 1 at % and less than 3 at %, it can be confirmed that there is the highest value as 197 $mAhg^{-1}$, and when a ratio of the graphene powder is 10 at %, that is, when exceeding 5 at %, it can be seen that the capacity rather decreases. Thus, it can be confirmed that doping the graphene powder to the $LiFePO_4$-based positive electrode active material, but controlling a ratio of the graphene powder to 5 at % or less, preferably controlling the graphene powder to more than 1 at % and less than 3 at %, is an efficient method to enhance a charge/discharge capacity.

In addition, as can be understood from FIG. 36, it can be confirmed that the $LiFePO_4$-based positive electrode active material of Experimental Example 1-5 has a high capacity, compared with the commercial $LiFePO_4$. When the graphene powder is doped according to Experimental Example 1-5, it can be confirmed that there is a high capacity compared to when the graphene powder is physically mixed as in Experimental Example 1-12.

In addition, even when the graphene powder is physically mixed, it can be seen that there is a high capacity when using $LiFePO_4$ synthesized according to an embodiment of the present application as a base positive active material as in Experimental Examples 1-12 rather than using commercial $LiFePO_4$ as a base positive electrode active material as in Experimental Examples 1-13.

In addition, when doping with the graphene powder synthesized according to Experimental Example 1-5 or when doping with the graphene peeled off according to Experimental Example 1-6, it can be seen that there is a high capacity of 197 $mAhg^{-1}$ and 186 $mAhg^{-1}$, respectively. In terms of the capacity value, a theoretical capacity value of $LiFePO_4$ is higher than 170 $mAhg^{-1}$, and it can be confirmed that the doped graphene powder is directly involved in the occlusion and desorption of lithium ions, thereby making a contribution as a positive electrode active material.

When the $LiFePO_4$-based positive electrode active material was coated with graphitic carbon according to Experimental Example 1-7, it had a capacity of 178 $mAhg^{-1}$, which is a relatively low value compared to Experimental Examples 1-5 and 1-2, which is understood as a result of enhanced conductivity due to the graphitic carbon.

Figure 37:
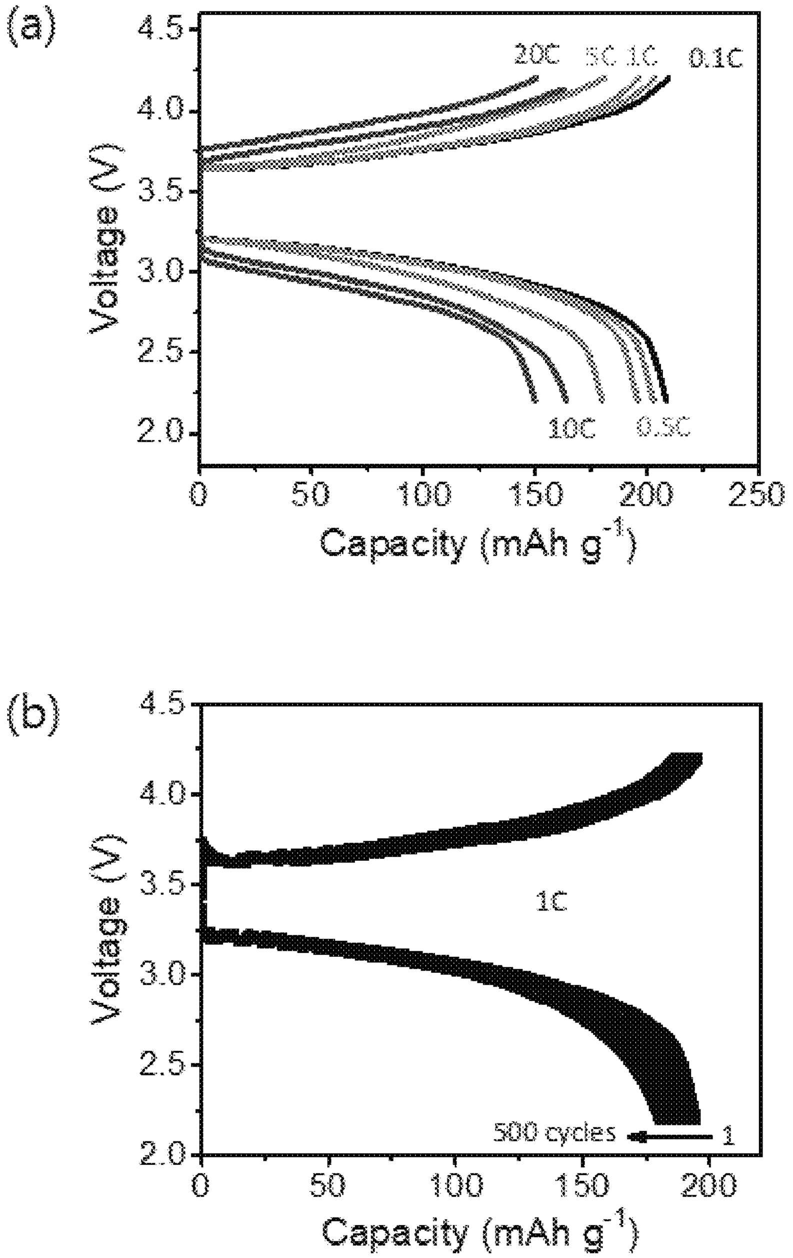
FIG. 37 is a graph for explaining charge/discharge properties of a lithium second battery including a functional positive electrode active material according to Experimental Example 1-5 of the present application.
Figure 38:
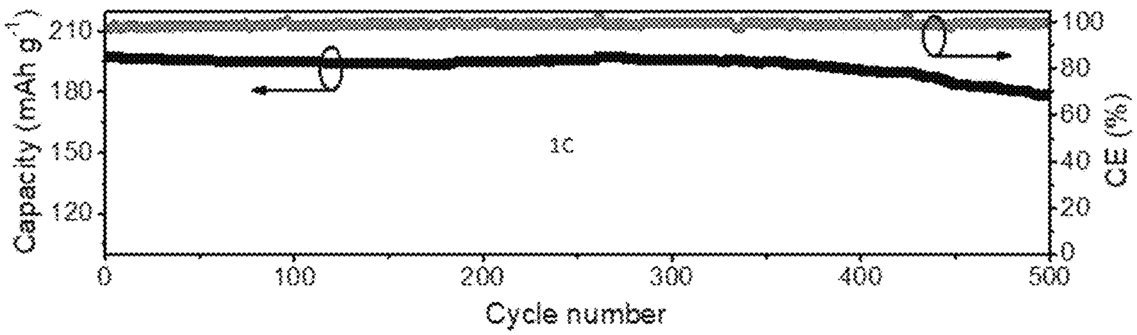
FIG. 38 is a graph for explaining life properties of a lithium second battery including a functional positive electrode active material according to Experimental Example 1-5 of the present application.

FIG. 37 is a graph for explaining charge/discharge properties of a lithium second battery including a functional positive electrode active material according to Experimental Example 1-5 of the present application, and FIG. 38 is a graph for explaining life properties of a lithium second battery including a functional positive electrode active material according to Experimental Example 1-5 of the present application.

Referring to FIGS. 37 and 38, a lithium secondary battery was prepared by using the functional positive electrode active material doped with graphene powder of 2 at % according to Experimental Example 1-5, a lithium foil negative electrode, and a solid electrolyte according to Experimental Example 8-3 to be described later, and charging and discharging were performed under 0.1C, 0.5C, 1C, 5C, 10C, and 20C conditions.

It can be seen that the lithium secondary battery including the functional positive electrode active material according to Experimental Example 1-5 has a capacity value of 208 $mAhg^{-1}$ under 0.1C condition, and it can be confirmed that the battery maintains a high capacity value of 149 $mAhg^{-1}$ even under 20C condition.

In addition, it can be confirmed that the battery maintains a capacity of 89% compared to an initial capacity and has a coulombic efficiency of 99.6% or more even after 500 times of charging/discharging under 1C condition.

Hereinafter, according to specific experimental examples of the present application, a solid electrolyte including a compound in which various cations and anions are bound, and results of evaluating their properties will be described.

Preparing of Compound according to Experimental Example 2-1

Acetonitrile was provided into a conical flask, after which dichloromethane was added and stirred at room temperature for 10 minutes to prepare a solution containing an alkyl group. In this case, the preparation of the solution containing the alkyl group was performed in a glove box without moisture.

Thiophene was dripped into the solution containing the alkyl group while being stirred, after which a uniformly mixed solution was slowly stirred at room temperature for four days so as to prepare thiophenium salt having a methyl group which is a cation source.

A washing process was performed by providing the thiophenium salt and a solvent of ethyl acetate and diethyl ether into a rotary concentrator.

1M hydrofluoric acid and extra water were added into a conical flask and stirred for 10 minutes to prepare a fluorohydrogenate precursor which is an anion source.

Thiophenium salt was added into the fluorohydrogenate precursor to prepare a mixed solution. The mixed solution was left alone at a temperature of −70° C. for 24 hours, so as to prepare a compound in which thiazolium salt and the fluorohydrogenate were bound as an intermediate product of the solid electrolyte.

The compound was provided into a glove box under a nitrogen atmosphere and left alone at room temperature for two to three hours, so that volatile gas was removed. After that, a drying process was performed by providing the compound into the rotary concentrator, so as to prepare a compound according to Experimental Example 2-1, in which a thiophenium cation having a methyl group (R1) and a fluorohydrogenate anion are bound.

Preparing of Compound according to Experimental Example 2-2

A compound was prepared by the same method as described above in Experimental Example 2-1. However, ethyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-2, in which a thiophenium cation having an ethyl group (R1) and a fluorohydrogenate anion are bound.

Preparing of Compound according to Experimental Example 2-3

A compound was prepared by the same method as described above in Experimental Example 2-1. However, propyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-3, in which a thiophenium cation having a propyl group (R1) and a fluorohydrogenate anion are bound.

Preparing of Compound according to Experimental Example 2-4

A compound was prepared by the same method as described above in Experimental Example 2-1. However, butyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-4, in which a thiophenium cation having a butyl group (R1) and a fluorohydrogenate anion are bound.

Preparing of Compound according to Experimental Example 3-1

A compound was prepared by the same method as described above in Experimental Example 2-1, but thiazoline was added into a solution containing an alkyl group so as to prepare thiazolium salt as a cation source.

After that, thiazolium salt and a fluorohydrogenate precursor were reacted by the same method as described above in Experimental Example 2-1, so as to prepare the compound according to Experimental Example 3-1, in which a thiazolium cation having a methyl group (R1) and a fluorohydrogenate anion are bound.

Preparing of Compound according to Experimental Example 3-2

A compound was prepared by the same method as described above in Experimental Example 2-2, but thiazoline was added into a solution containing an alkyl group so as to prepare thiazolium salt as a cation source.

After that, thiazolium salt and a fluorohydrogenate precursor were reacted by the same method as described above in Experimental Example 2-2, so as to prepare the compound according to Experimental Example 3-2, in which a thiazolium cation having an ethyl group (R1) and a fluorohydrogenate anion are bound.

Preparing of Compound according to Experimental Example 3-3

A compound was prepared by the same method as described above in Experimental Example 2-3, but thiazoline was added into a solution containing an alkyl group so as to prepare thiazolium salt as a cation source.

After that, thiazolium salt and a fluorohydrogenate precursor were reacted by the same method as described above in Experimental Example 2-3, so as to prepare the compound according to Experimental Example 3-3, in which a thiazolium cation having a propyl group (R1) and a fluorohydrogenate anion are bound.

Preparing of Compound according to Experimental Example 3-4

A compound was prepared by the same method as described above in Experimental Example 2-4, but thiazoline was added into a solution containing an alkyl group so as to prepare thiazolium salt as a cation source.

After that, thiazolium salt and a fluorohydrogenate precursor were reacted by the same method as described above in Experimental Example 2-4, so as to prepare the compound according to Experimental Example 3-4, in which a thiazolium cation having a butyl group (R1) and a fluorohydrogenate anion are bound.

Preparing of Compound according to Experimental Example 4-1

Phospholanium was provided as a cation, and fluorohydrogenate prepared according to Experimental Example 2-1 as described above was used as an anion, so as to prepare the compound according to Experimental Example 4-1, in which a phospholanium cation having a methyl group (R1) and an ethyl group (R2) and a fluorohydrogenate anion are bound.

Preparing of Compound according to Experimental Example 4-2

A compound was prepared by the same method as described above in Experimental Example 4-1, so as to prepare the compound according to Experimental Example 4-2, in which a phospholanium cation having a methyl group (R1) and a propyl group (R2) and a fluorohydrogenate anion are bound.

Preparing of Compound according to Experimental Example 4-3

A compound was prepared by the same method as described above in Experimental Example 4-1, so as to prepare the compound according to Experimental Example 4-3, in which a phospholanium cation having a methyl group (R1) and a butyl group (R2) and a fluorohydrogenate anion are bound.

Preparing of Compound according to Experimental Example 4-4

A compound was prepared by the same method as described above in Experimental Example 4-1, so as to prepare the compound according to Experimental Example 4-4, in which a phospholanium cation having an ethyl group (R1) and a butyl group (R2) and a fluorohydrogenate anion are bound.

Preparing of Compound according to Experimental Example 4-5

A compound was prepared by the same method as described above in Experimental Example 4-1, so as to prepare the compound according to Experimental Example 4-5, in which a phospholanium cation having a methyl group (R1) and a methyl group (R2) and a fluorohydrogenate anion are bound.

Preparing of Compound according to Experimental Example 5-1

Oxathiolanium represented by <Formula 8> was provided as a cation, and fluorohydrogenate prepared according to Experimental Example 2-1 as described above was used as an anion, so as to prepare the compound according to Experimental Example 5-1, in which an oxathiolanium cation having a methyl group (R1) and a fluorohydrogenate anion are bound.

Preparing of Compound according to Experimental Example 5-2

A compound was prepared by the same method as described above in Experimental Example 5-1, so as to prepare the compound according to Experimental Example 5-2, in which an oxathiolanium cation having an ethyl group (R1) and a fluorohydrogenate anion are bound.

Preparing of Compound according to Experimental Example 5-3

A compound was prepared by the same method as described above in Experimental Example 5-1, so as to prepare the compound according to Experimental Example 5-3, in which an oxathiolanium cation having a propyl group (R1) and a fluorohydrogenate anion are bound.

Preparing of Compound according to Experimental Example 5-4

A compound was prepared by the same method as described above in Experimental Example 5-1, so as to prepare the compound according to Experimental Example 5-4, in which an oxathiolanium cation having a butyl group (R1) and a fluorohydrogenate anion are bound.

Preparing of Compound according to Experimental Example 6-1

Thiazolidinium was provided as a cation, and fluorohydrogenate prepared according to Experimental Example 2-1 as described above was used as an anion, so as to prepare the compound according to Experimental Example 6-1, in which a thiazolidinium cation having a methyl group (R1) and an ethyl group (R2) bound to a nitrogen element, and two methyl groups bound to a sulfur element, and a fluorohydrogenate anion are bound.

Preparing of Compound according to Experimental Example 6-2

A compound was prepared by the same method as described above in Experimental Example 6-1, so as to prepare the compound according to Experimental Example 6-2, in which a thiazolidinium cation having a methyl group (R1) and a propyl group (R2) bound to a nitrogen element, and two methyl groups bound to a sulfur element, and a fluorohydrogenate anion are bound.

Preparing of Compound according to Experimental Example 6-3

A compound was prepared by the same method as described above in Experimental Example 6-1, so as to prepare the compound according to Experimental Example 6-3, in which a thiazolidinium cation having a methyl group (R1) and a butyl group (R2) bound to a nitrogen element, and two methyl groups bound to a sulfur element, and a fluorohydrogenate anion are bound.

Preparing of Compound according to Experimental Example 6-4

A compound was prepared by the same method as described above in Experimental Example 6-1, so as to prepare the compound according to Experimental Example 8-4, in which a thiazolidinium cation having an ethyl group (R1) and a butyl group (R2) bound to a nitrogen element, and two methyl groups bound to a sulfur element, and a fluorohydrogenate anion are bound.

The ion conductivity of the compounds according to Experimental Examples 2-1 to 6-4 was measured at room temperature, and the ion molecular weight of cations and the state information of the compounds according to Experimental Examples 2-1 to 6-4 are summarized as shown in <Table 3>.

TABLE 3

| Classification | Cation | Alkyl group | Ion molecular weight (g/mol) | State | Ion conductivity ($mS/cm^2$) |
|---|---|---|---|---|---|
| Experimental Example 2-1 | Thiophenium | Methyl group | 99.15 | Crystalline solid | 126 |
| Experimental Example 2-2 | | Ethyl group | 113.14 | Crystalline solid | 103 |
| Experimental Example 2-3 | | Propyl group | 127.15 | Crystalline solid | 68 |
| Experimental Example 2-4 | | Butyl group | 142.16 | Crystalline solid | 46 |
| Experimental Example 3-1 | Thiazolium | Methyl group | 101.13 | Crystalline solid | 45 |
| Experimental Example 3-2 | | Ethyl group | 114.14 | Crystalline solid | 74 |
| Experimental Example 3-3 | | Propyl group | 126.15 | Crystalline solid | 18.9 |
| Experimental Example 3-4 | | Butyl group | 143.13 | Crystalline solid | 6.8 |
| Experimental Example 4-1 | Phospholanium | Methyl group/ Ethyl group | 130.97 | Crystalline solid | 2 |
| Experimental Example 4-2 | | Methyl group/ Propyl group | 143.1 | Crystalline solid | 35 |
| Experimental Example 4-3 | | Methyl group/ Butyl group | 159.9 | Crystalline solid | 16 |
| Experimental Example 4-4 | | Ethyl group/ Butyl group | 174 | Crystalline solid | 45 |
| Experimental Example 4-5 | | Methyl group/ Methyl group | 117 | Crystalline solid | 24 |
| Experimental Example 5-1 | Oxathiolanium | Methyl group | 106.06 | Crystalline solid | 12 |
| Experimental Example 5-2 | | Ethyl group | 120.07 | Crystalline solid | 17.5 |
| Experimental Example 5-3 | | Propyl group | 132.06 | Crystalline solid | 26.5 |
| Experimental Example 5-4 | | Butyl group | 149.06 | Crystalline solid | 21.1 |
| Experimental Example 6-1 | Thiazolidinium | Methyl group/ Ethyl group Methyl group/ Methyl group | 99.15 | Crystalline solid | 60 |
| Experimental Example 6-2 | | Methyl group/ Propyl group Methyl group/ Methyl group | 113.14 | Crystalline solid | 19.6 |
| Experimental Example 6-3 | | Methyl group/ Butyl group Methyl group/ Methyl group | 127.15 | Crystalline solid | 28.7 |
| Experimental Example 6-4 | | Ethyl group/ Butyl group Methyl group/ Methyl group | 142.16 | Crystalline solid | 5.8 |

As can be understood from <Table 3>, it can be confirmed that compounds have a high ion conductivity, if thiophenium is included as a cation (Experimental Examples 2-1 to 2-4), if thiazolium having a methyl group, an ethyl group, or a propyl group is included (Experimental Examples 3-1 to 3-3), if phospholanium having a methyl group/propyl group, a methyl group/butyl group, an ethyl group/butyl group, or a methyl group/methyl group is included (Experimental Examples 4-2 to 4-5), if oxathiolanium having an ethyl group, a propyl group, or a butyl group is included (Experimental Examples 5-2 to 5-4), and if a thiazolidinium having a methyl group/ethyl group, a methyl group/propyl group, and a methyl group/butyl group is included (Experimental Examples 6-1 to 6-3).

Thiophenium having a methyl group identified as having the highest ion conductivity in <Table 3> was fixed as a cation and a type of anion was varied to prepare a compound for a solid electrolyte according to Experimental Examples 7-1 to 7-2.

Preparing of Compound according to Experimental Example 7-1

Cyano(nitroso)methanide was provided as an anion so as to prepare a compound according to Experimental Example 7-1 in which a thiophenium cation having a methyl group according to Experimental Example 2-1 as described above and a cyano(nitroso)methanide anion are bound.

Preparing of Compound according to Experimental Example 7-2

Tetrazolidine was provided as an anion so as to prepare a compound according to Experimental Example 7-2 in which a thiophenium cation having a methyl group according to Experimental Example 2-1 as described above and a tetrazolidine anion are bound.

The ion conductivity of the compounds according to Experimental Examples 7-1 to 7-2 was measured at room temperature, and the molecular weight of anions, the state information of the compounds according to Experimental Examples 7-1 to 7-2 are summarized as shown in <Table 4>.

TABLE 4

| Classification | Anion | Ion Molecular weight (g/mol) | State | Ion conductivity (mS/cm$^2$) |
|---|---|---|---|---|
| Experimental Example 1-1 | Fluorohydrogenate | 63 | Crystalline solid | 126 |
| Experimental Example 7-1 | Cyano(nitro) methanide | 69 | Crystalline solid | 48.6 |
| Experimental Example 7-2 | Tetrazolidine | 72 | Crystalline solid | 69.4 |

As can be understood from <Table 4>, it can be confirmed that compounds have a high ion conductivity, if fluorohydrogenate is included as an anion (Experimental Example 2-1), if cyano(nitroso)methanide is included (Experimental Example 7-1), and if tetrazolidine is included (Experimental Examples 7-2).

Preparing of Solid Electrolyte according to Experimental Example 8-1

A 1M hydrofluoric acid aqueous solution and lithium chloride (LiCl) were added into a container and left alone at a temperature of −70° C. for 24 hours, so as to prepare lithium fluorohydrogenate.

A compound having a methyl group according to Experimental Example 2-1 described above was heated to 60° C. and lithium fluorohydrogenate was added in an amount of 1 mol % at the same time and reacted for two hours, so as to prepare a solid electrolyte according to Experimental Example 8-1.

Preparing of Solid Electrolyte according to Experimental Example 8-2

A solid electrolyte was prepared by the same method as described above in Experimental Example 8-1. However, lithium fluorohydrogenate was added in an amount of 5 mol % instead of 1 mol %, so as to prepare a solid electrolyte according to Experimental Example 8-2.

Preparing of Solid Electrolyte according to Experimental Example 8-3

A solid electrolyte was prepared by the same method as described above in Experimental Example 8-1. However, lithium fluorohydrogenate was added in an amount of 10 mol % instead of 1 mol %, so as to prepare a solid electrolyte according to Experimental Example 8-3.

Figure 39:
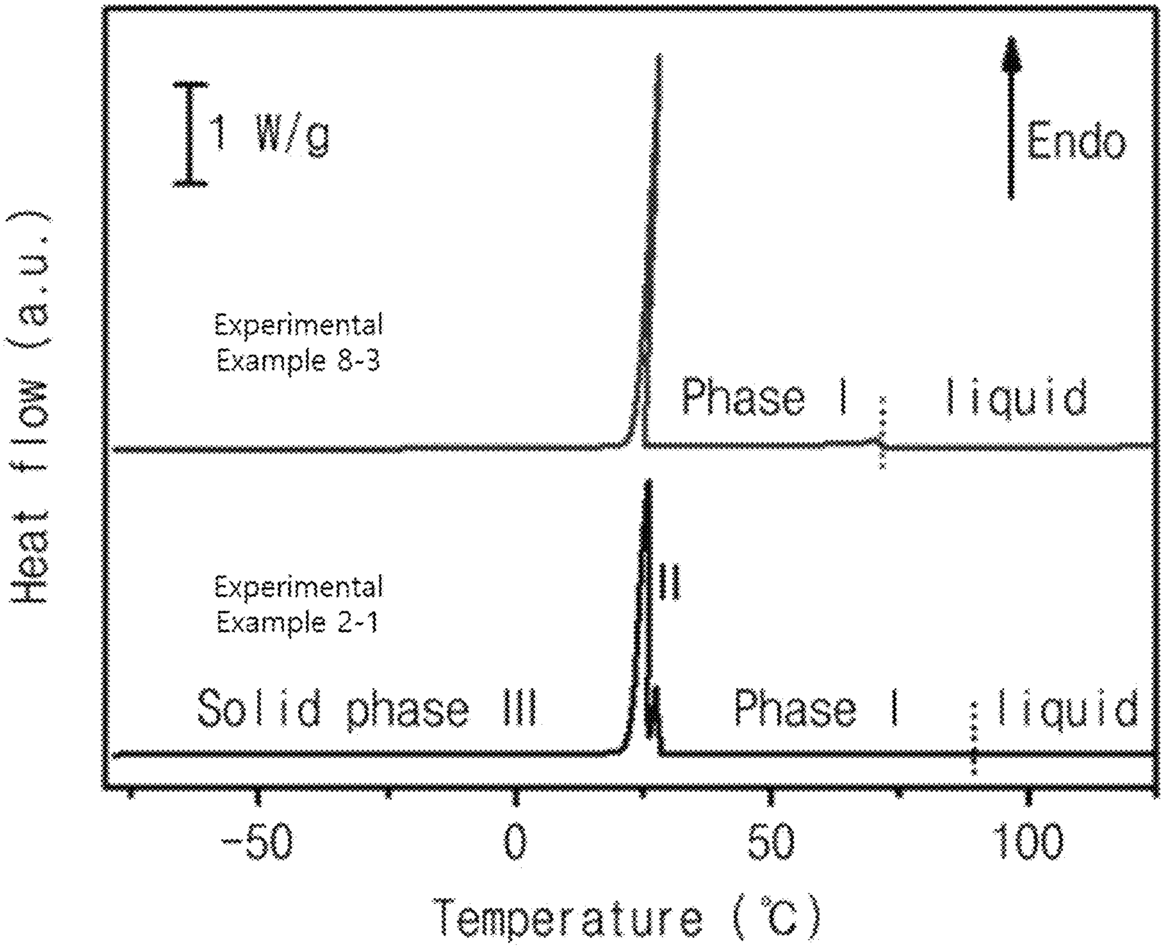
FIG. 39 is a differential scanning calorimetry (DSC) graph showing a compound according to Experimental Example 2-1 and a solid electrolyte according to Experimental Example 8-3 of the present application.

FIG. 39 is a differential scanning calorimetry (DSC) graph showing a compound according to Experimental Example 2-1 and a solid electrolyte according to Experimental Example 8-3 of the present application.

Referring to FIG. 39, a solid-liquid or solid-solid state change depending on a temperature may be observed in the compound according to Experimental Example 2-1 and the solid electrolyte according to Experimental Example 8-3.

As shown in FIG. 39, a solid-liquid state change was observed at 90t in the compound of Experimental Example 2-1. In contrast, a solid-liquid state change was observed at 70° C. in the solid electrolyte of Experimental Example 8-3.

In addition, a solid-solid state change was observed twice in the compound of Experimental Example 2-1, and specifically it can be seen that the compound of Experimental Example 2-1 has a first crystal phase in a temperature range of 28 to 90° C. and a second crystal phase in a temperature range of 22 to 28° C. In contrast, a solid-solid state change was observed once in the solid electrolyte of Experimental Example 8-3, and it can be confirmed that the solid electrolyte has one crystal phase in a temperature range of 22 to 70° C.

Figure 40:
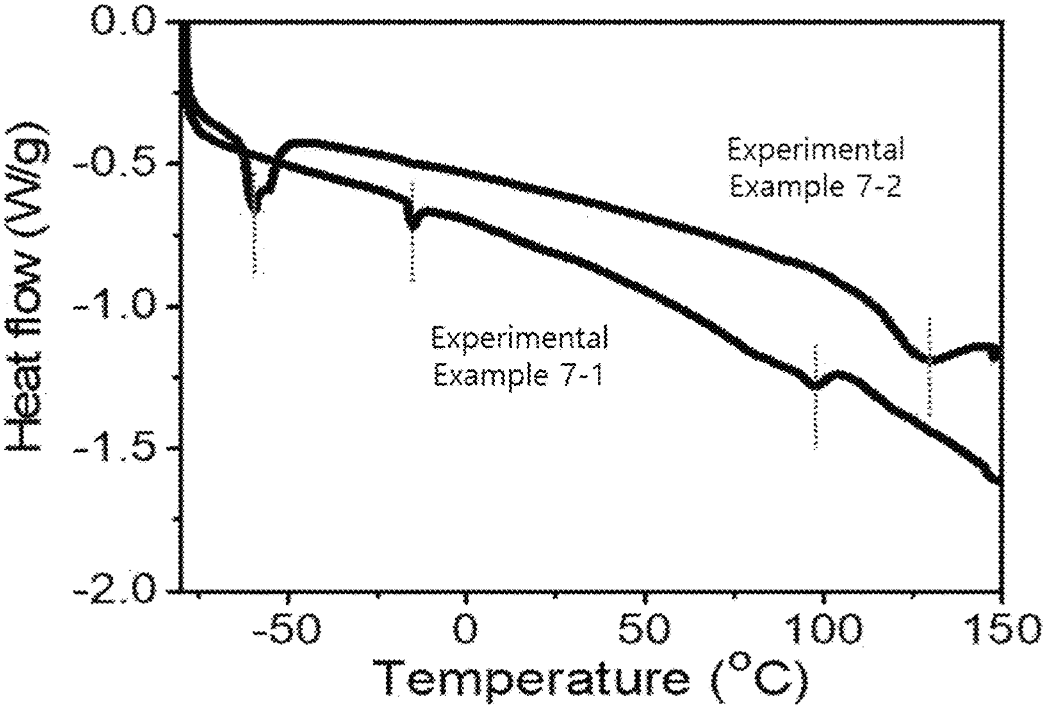
FIG. 40 is a DSC graph showing a compound according to Experimental Examples 7-1 and 7-2 of the present application.

FIG. 40 is a DSC graph showing a compound according to Experimental Examples 7-1 and 7-2 of the present application.

Referring to FIG. 40, a state change of compounds according to Experimental Examples 7-1 and 7-2 was observed depending on a temperature.

As can be understood from FIG. 40, it can be confirmed that the compounds according to Experimental Examples 7-1 and 7-2 stably maintain a solid crystal phase in a relatively wide range of temperatures. Specifically, it can be confirmed that the compound according to Experimental Example 7-1 and the compound according to Experimental Example 7-2 stably maintain a solid crystal phase −15 to 98° C. and at −59 to 129° C., respectively. In addition, the compounds according to Experimental Examples 7-1 and 7-2 have a somewhat low ion conductivity compared to the compound according to Experimental Example 2-1, but stably maintain a crystal phase in a range of temperatures wider than the range of temperatures (28 to 90° C.) in which the compound according to Experimental Example 2-1 stably maintains a first crystal phase as shown in FIG. 39. Accordingly, the compounds according to Experimental Examples 7-1 and 7-2 can be useful in military or space fields, or low-temperature environments such as a polar region.

Figure 41:
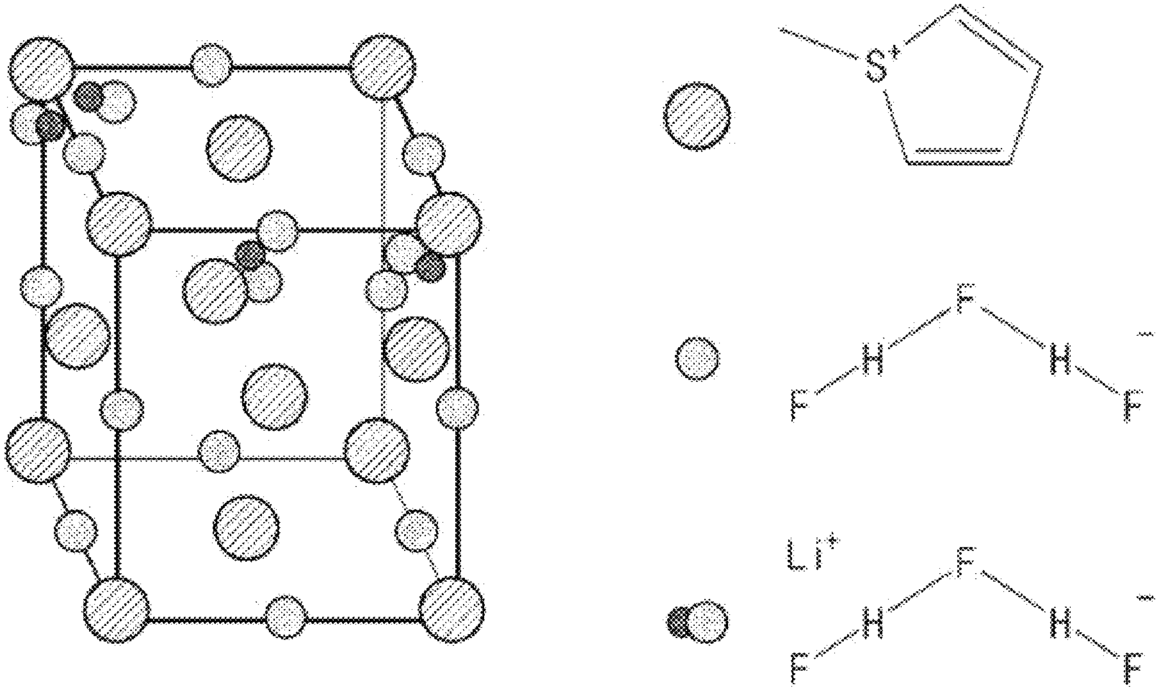
FIG. 41 is a view for explaining a crystal structure of a solid electrolyte according to Experimental Examples 8-1 to 8-3 of the present application.

FIG. 41 is a view for explaining a crystal structure of a solid electrolyte according to Experimental Examples 8-1 to 8-3 of the present application.

Referring to FIG. 41, the solid electrolytes according to Experimental Examples 8-1 to 8-3 may include a thiophenium cation, a fluorohydrogenate anion and lithium salt.

A unit cell of the compound in which a thiophenium cation and a fluorohydrogenate anion are bound may have an orthorhombic crystal structure, in which the thiophenium cation may be provided at a vertex of the crystal structure and at a center of a face thereof, and the fluorohydrogenate anion may be provided in a middle of an edge of the crystal structure. In this case, the solid electrolyte of Experimental Examples 8-1 to 8-3 may have the lithium salt optionally provided at interstitial sites of the crystal structure. Specifically, the lithium salt may include lithium fluorohydrogenate.

The lithium salt may be provided at the interstitial sites of the crystal structure of the compound, and thus may easily move within the crystal structure. Accordingly, an ion conductivity may increase as an addition amount of the lithium fluorohydrogenate, which is lithium salt, increases.

Figure 42:
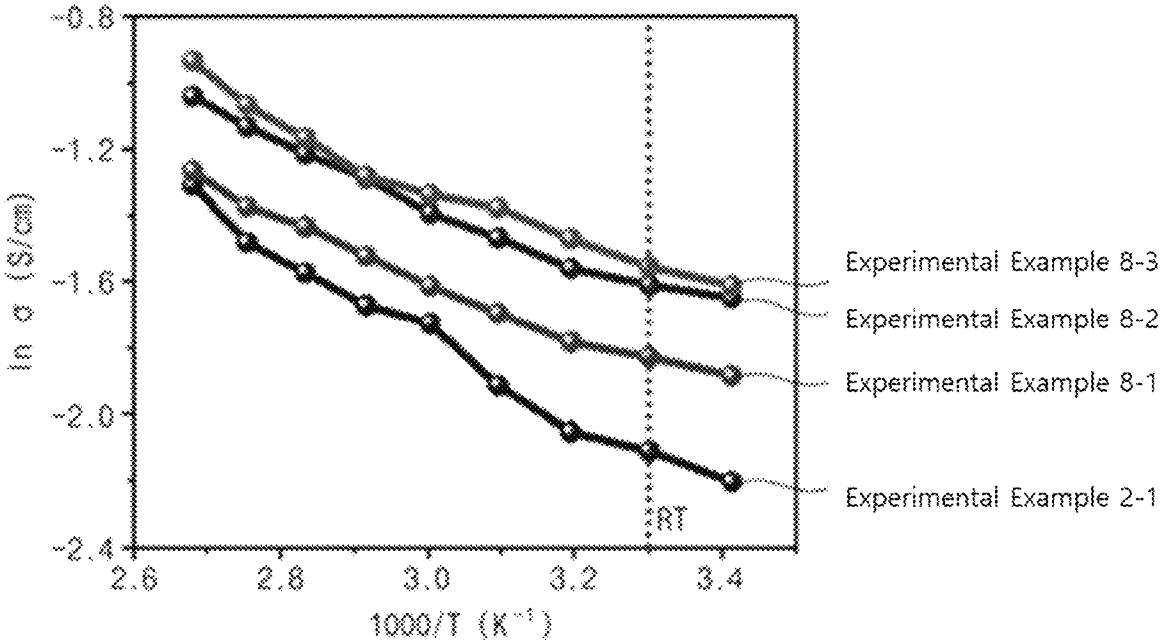
FIG. 42 is a graph showing an ion conductivity of a compound according to Experimental Example 2-1 and a solid electrolyte according to Experimental Examples 8-1 to 8-3 of the present application depending on a temperature.

FIG. 42 is a graph showing an ion conductivity of a compound according to Experimental Example 2-1 and a solid electrolyte according to Experimental Examples 8-1 to 8-3 of the present application depending on a temperature.

Referring to FIG. 42, a lithium ion conductivity was measured with regard to a compound according to Experimental Example 2-1 and a solid electrolyte according to Experimental Examples 8-1 to 8-3. As described above with reference to FIG. 41, lithium fluorohydrogenate may be optionally provided at interstitial sites in the crystal structure of the compound of the solid electrolyte of Experimental Examples 8-1 to 8-3. Accordingly, it was observed that lithium fluorohydrogenate may easily move within the crystal structure, and thus, when an addition amount of lithium fluorohydrogenate is increased, an ion conductivity becomes higher.

In this case, lithium fluorohydrogenate may move to interstitial sites in the crystal structure where lithium fluorohydrogenate is not provided, and may exhibit a high ion conductivity. Thus, as the interstitial sites provided with lithium fluorohydrogenate increase, a rate of increase in ion conductivity may reach saturation. In other words, as shown in FIG. 42, it can be confirmed that the ion conductivity substantially reaches saturation, if an addition amount of the lithium fluorohydrogenate is 5 mol % or more.

Figure 43:
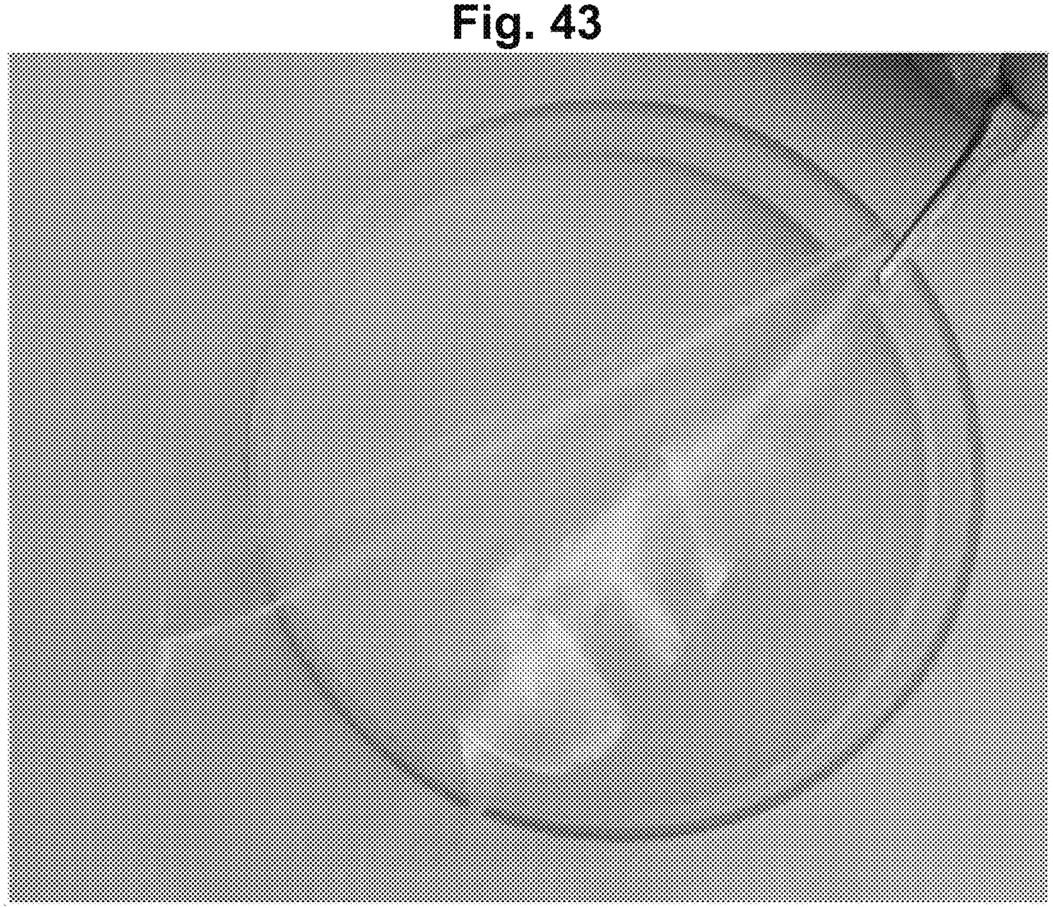
FIG. 43 is a view showing pictures of an electrolyte membrane coated with a solid electrolyte according to Experimental Example 8-1 of the present application.

FIG. 43 is a picture of a electrolyte membrane coated with a solid electrolyte according to Experimental Example 8-1 of the present application.

Referring to FIG. 43, a picture was taken of a solid electrolyte membrane in the form of a film in which a solid electrolyte according to Experimental Example 8-1 of the present application is coated on a polytetrafluoroethylene (PTFE) resin. In this case, it was confirmed that the solid electrolyte membrane maintains the softness and transparency of the resin.

Although the present application has been described in detail with reference to exemplary embodiments, the scope of the present application is not limited to a specific embodiment and should be interpreted by the attached claims. In addition, those skilled in the art should understand that many modifications and variations are possible without departing from the scope of the present application.

INDUSTRIAL APPLICABILITY

A positive electrode active material according to an embodiment of the present application may be used for a secondary battery.

The invention claimed is:

1. A method for preparing a functional positive electrode active material, the method comprising:

providing a first stock solution in which a base positive electrode active material including a compound of lithium, iron, phosphorus, and oxygen is dispersed in a first solvent;

providing a second stock solution in which graphene powder is dispersed in a second solvent; and preparing the functional positive electrode active material in which the graphene powder is doped into the base positive electrode active material by mixing and heat-treating the first stock solution and the second stock solution, wherein the functional positive electrode active material has a first crystallinity in a first state before a charging and discharging process of a lithium secondary battery that includes the functional positive electrode active material, wherein the functional positive electrode active material has a second crystallinity in a second state after the charging and discharging process, wherein the second crystallinity is higher than the first crystallinity as a result of performing the charging and discharging process, wherein the functional positive electrode active material has a disorder/defect band (“D band”) and a graphitic band (“G band”), wherein a ratio ($I_D/I_G$) value of intensity of the D band to intensity of the G band is greater than 1.98 and less than 3.26 when measuring a Raman spectrum, wherein the functional positive electrode active material has a graphene powder content greater than 1 at % and less than 3 at %, and wherein the functional positive electrode active material has a capacity value greater than a theoretical capacity value of 170 mAh $g^{-1}$ for lithium iron phosphate.

2. The method of claim 1, wherein the first solvent and the second solvent are a same solvent.

3. The method of claim 2, wherein the first solvent and the second solvent comprises N-methyl-2-pyrrolidone (NMP).

4. The method of claim 1, wherein providing the second stock solution comprises:

preparing a graphene colloid having the graphene powder by mixing the graphene powder with an oxidizing agent and heat-treating a mixture of the graphene powder and the oxidizing agent;

obtaining the graphene powder from the graphene colloid; and dispersing the graphene powder in the second solvent.

5. The method of claim 4, wherein the oxidizing agent is hydrogen peroxide.

* * * * *